(12) United States Patent
Cumbie et al.

(10) Patent No.: US 11,046,084 B2
(45) Date of Patent: Jun. 29, 2021

(54) LIQUID LEVEL SENSING

(71) Applicant: HEWLETT-PACKARD DEVELOPMENT COMPANY, L.P., Houston, TX (US)

(72) Inventors: Michael W. Cumbie, Corvallis, OR (US); Chien-Hua Chen, Corvallis, OR (US); Devin Alexander Mourey, Corvallis, OR (US); Anthony D. Studer, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 243 days.

(21) Appl. No.: 16/092,350

(22) PCT Filed: Apr. 21, 2016

(86) PCT No.: PCT/US2016/028642
§ 371 (c)(1),
(2) Date: Oct. 9, 2018

(87) PCT Pub. No.: WO2017/184147
PCT Pub. Date: Oct. 26, 2017

(65) Prior Publication Data
US 2019/0111694 A1 Apr. 18, 2019

(51) Int. Cl.
*B41J 2/175* (2006.01)
*G01F 23/24* (2006.01)
*G01F 23/26* (2006.01)

(52) U.S. Cl.
CPC ......... *B41J 2/17566* (2013.01); *B41J 2/1753* (2013.01); *G01F 23/247* (2013.01);
(Continued)

(58) Field of Classification Search
CPC ............ B41J 2002/17579; B41J 2/1753; B41J 2/17566; G01F 23/268; G01F 23/266;
(Continued)

(56) References Cited

U.S. PATENT DOCUMENTS 3,797,310 A 3/1974 Babcock
4,567,762 A 2/1986 Hopper et al.
(Continued)

FOREIGN PATENT DOCUMENTS

CN 1496477 5/2004
CN 102205726 10/2011
(Continued)

OTHER PUBLICATIONS

Baliga, B. N.; "Liquid Level Sensing Using Planar Inter-digitated Electrodes Employing CMOS Process"; Proceedings for Sensors & Transducers; Mar. 31, 2015; pp. 79-84; vol. 186; No. 3.

*Primary Examiner* — Octavia Hollington
(74) *Attorney, Agent, or Firm* — Fabian Vancott

(57) ABSTRACT

In one example a liquid level sensing device is described. The device includes a carrier and a liquid level sensing device disposed on the carrier. The liquid level sensing interface has an aspect ratio of at least 1:50. A number of liquid level sensing components are disposed on the liquid level sensing interface. The number of liquid level sensing components detect a liquid level in a liquid container. The liquid level sensing device also includes an electrical interconnect to output data collected from the number of liquid level sensing components.

20 Claims, 13 Drawing Sheets

(52) U.S. Cl.
CPC ... *G01F 23/248* (2013.01); *B41J 2002/17579* (2013.01); *G01F 23/265* (2013.01)

(58) Field of Classification Search
CPC ...... G01F 23/22; G01F 23/247; G01F 23/248; G01F 23/265
USPC ....................................................... 73/304 R
See application file for complete search history.

(56) References Cited

U.S. PATENT DOCUMENTS

| | | | |
|---|---|---|---|
| 5,129,261 A * | 7/1992 | Riley | G01F 23/68 338/33 |
| 5,507,178 A | 4/1996 | Dam | |
| 5,731,824 A | 3/1998 | Kneezel et al. | |
| 6,862,932 B2 * | 3/2005 | Zimmermann | G01F 23/246 73/290 R |
| 6,938,478 B2 | 9/2005 | Arias | |
| 7,334,471 B2 | 2/2008 | Maatuk | |
| 7,487,676 B2 * | 2/2009 | Shin | G01F 23/74 73/290 R |
| 8,181,515 B2 * | 5/2012 | Stephens | G01F 23/0084 73/301 |
| 8,590,375 B2 | 11/2013 | Farmanyan | |
| 8,602,540 B2 | 12/2013 | Kura | |
| 9,810,566 B2 * | 11/2017 | Eshchenko | G01F 23/247 |
| 10,107,667 B2 * | 10/2018 | Cumbie | B41J 2/195 |
| 10,739,181 B2 * | 8/2020 | Cumbie | B41J 2/17566 |
| 2003/0177826 A1 | 9/2003 | Adkadkam et al. | |
| 2005/0120791 A1 | 6/2005 | Carlson | |
| 2005/0126282 A1 | 6/2005 | Maatuk | |
| 2008/0016960 A1 | 1/2008 | Zimmermann et al. | |
| 2008/0156801 A1 | 7/2008 | Tung et al. | |
| 2011/0221802 A1 | 9/2011 | Sabanovic et al. | |
| 2012/0306974 A1 | 12/2012 | Nicholson, III et al. | |
| 2014/0260520 A1 | 9/2014 | Schoenberg | |

FOREIGN PATENT DOCUMENTS

| | | |
|---|---|---|
| CN | 202974385 | 6/2013 |
| EP | 1705463 | 9/2006 |
| EP | 2436524 B1 | 2/2014 |
| JP | S57161508 | 10/1982 |
| JP | 2006090714 | 4/2006 |
| JP | 2011185931 | 9/2011 |
| JP | 2016020851 | 2/2016 |
| RU | 2284595 C2 | 7/2005 |
| RU | 2319114 C1 | 10/2008 |
| RU | 2564862 C2 | 5/2015 |
| TW | 201033019 A | 9/2010 |
| TW | 201425056 A | 7/2014 |
| TW | 201520070 A | 6/2015 |
| WO | WO-2015/181770 | 12/2015 |

* cited by examiner

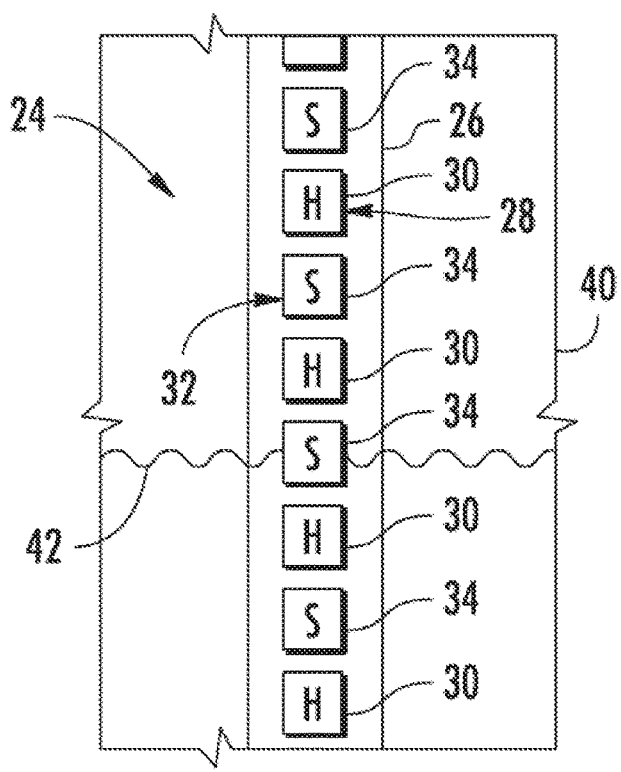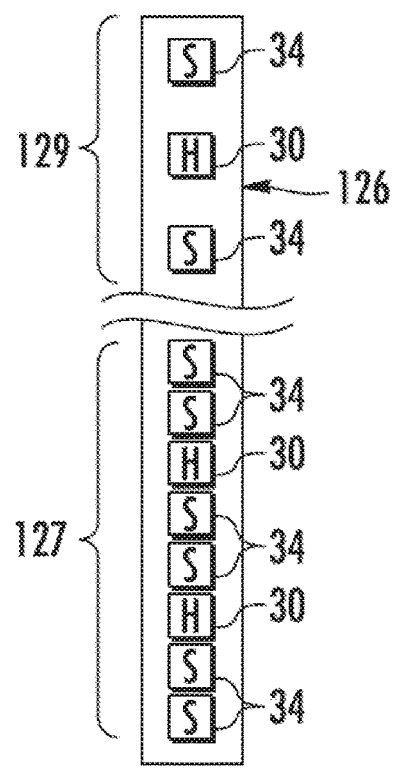
Fig. 1A  Fig. 1B
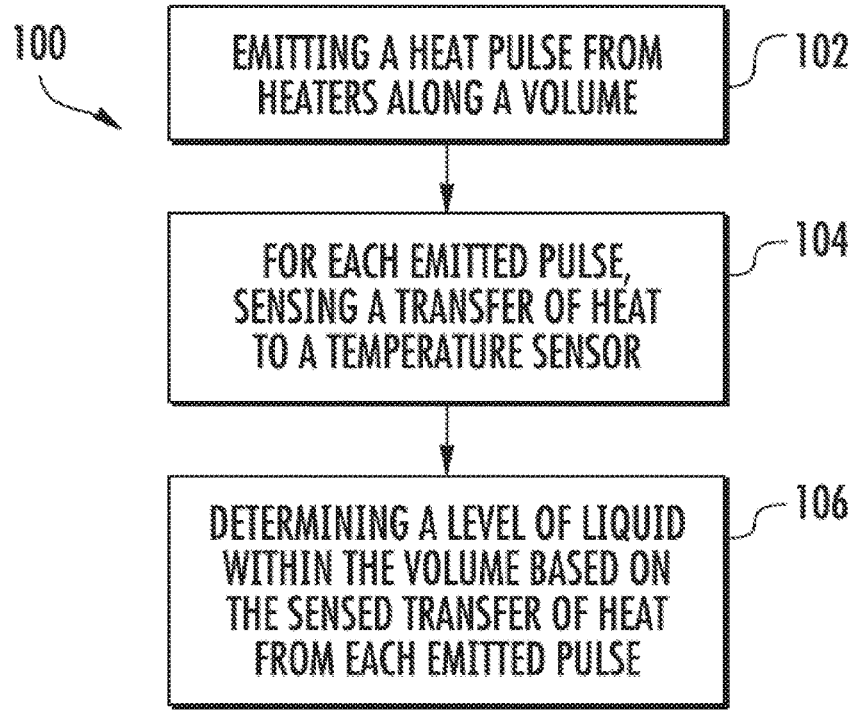
Fig. 2

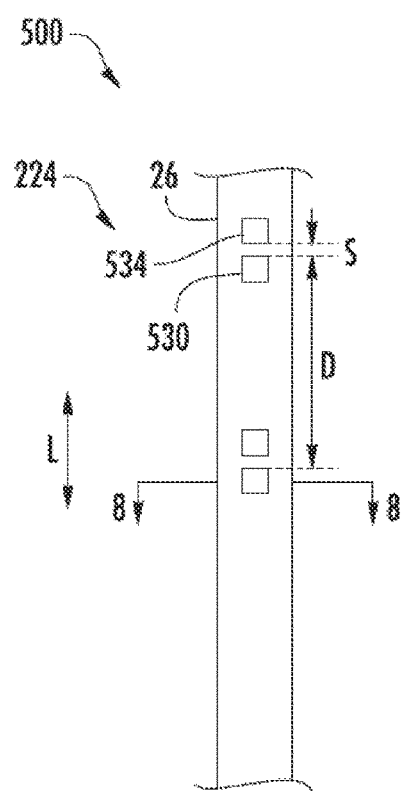
Fig. 6
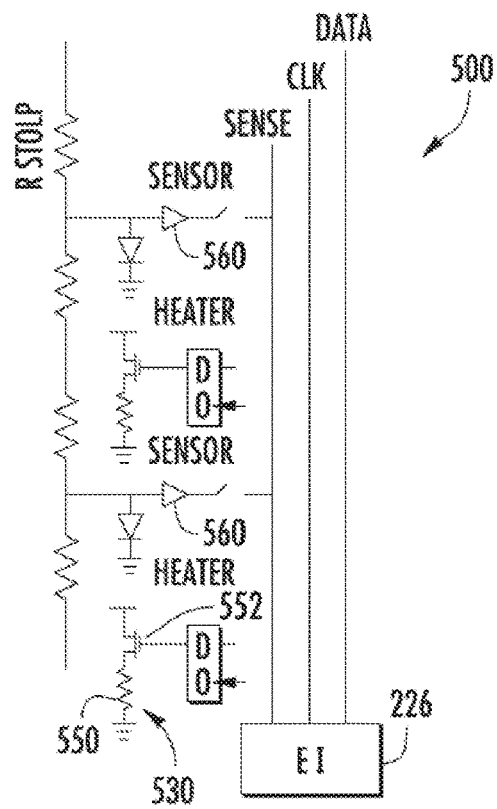
Fig. 7
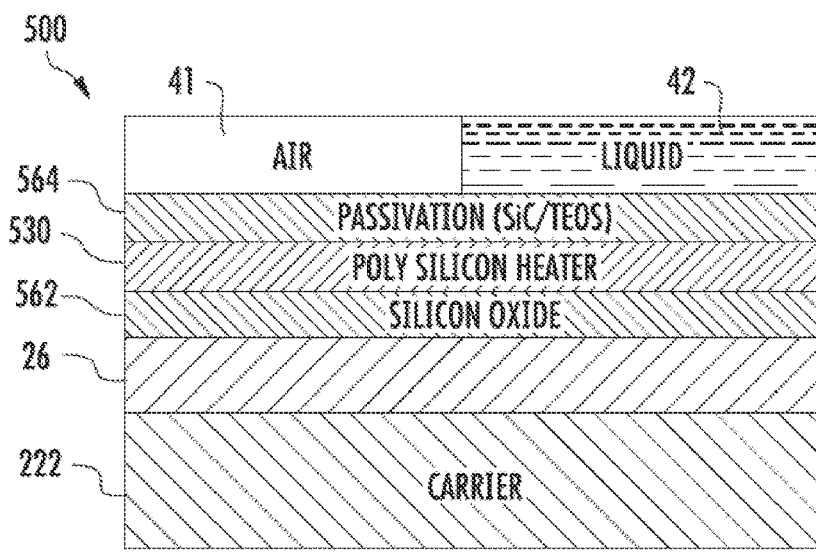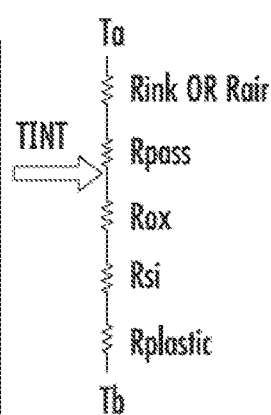
Fig. 8

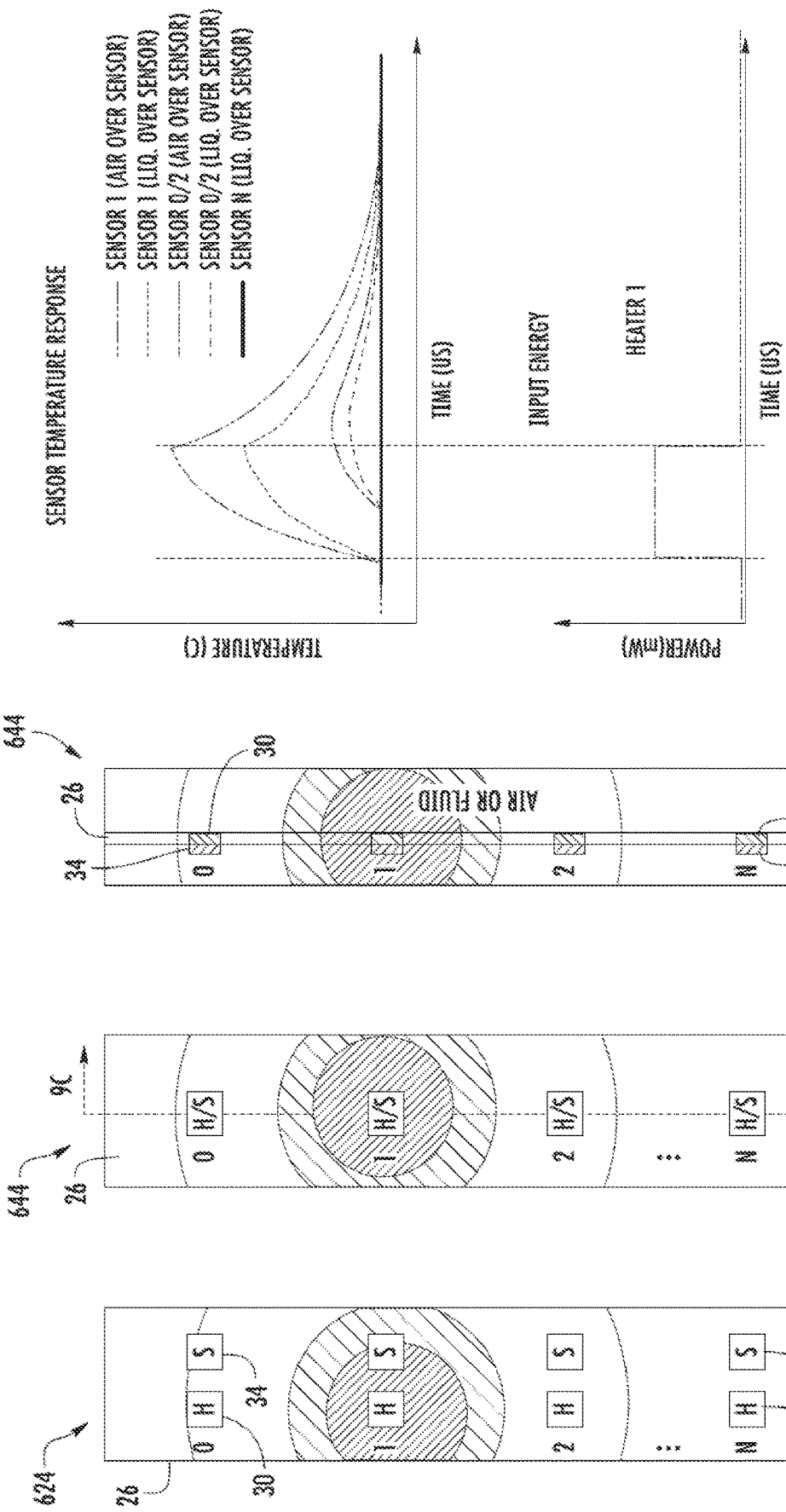

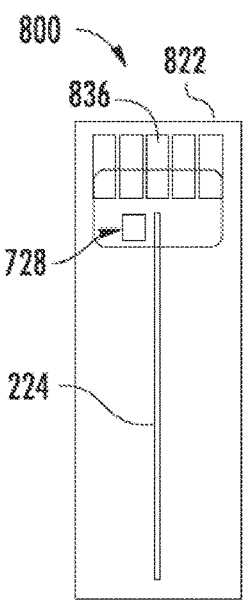
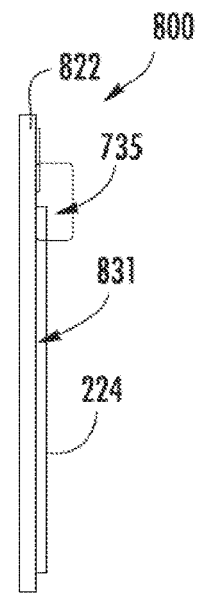
Fig. 14   Fig. 15
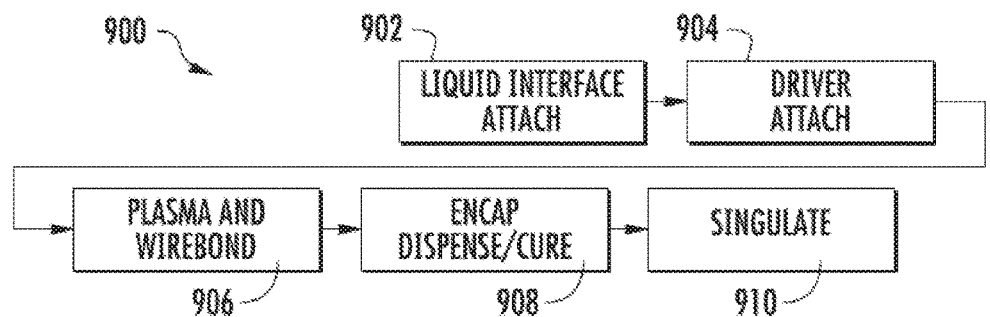
Fig. 16
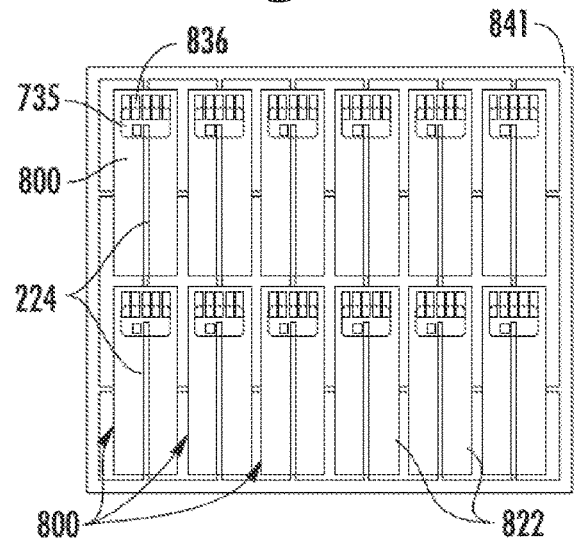
Fig. 17

LIQUID LEVEL SENSING

BACKGROUND

Liquid containers are used to contain various types of liquids. For example in printing systems, print cartridges hold stores of printing liquid such as ink. The ink, or other printing liquid from a reservoir, is supplied to a printhead which deposits the printing liquid onto a print medium, such as paper. As the printing liquid is deposited onto a print medium, the printing liquid is depleted from the liquid reservoir.

BRIEF DESCRIPTION OF THE DRAWINGS

The accompanying drawings illustrate various examples of the principles described herein and are part of the specification. The illustrated examples are given merely for illustration, and do not limit the scope of the claims.

FIG. 1A is a diagram of a portion of a liquid level sensing interface, according to one example of the principles described herein.

FIG. 1B is a diagram of portions of a liquid level sensing interface, according to one example of the principles described herein.

FIG. 2 is a flow diagram of a method for determining a level of liquid, according to one example of the principles described herein.

FIG. 6 is a diagram of a portion of a liquid level sensing interface of a liquid level sensor, according to one example of the principles described herein.

FIG. 7 is a circuit diagram of the liquid level sensor of FIG. 6, according to one example of the principles described herein.

FIG. 8 is a sectional view of the liquid level sensing interface of FIG. 6, according to one example of the principles described herein.

FIG. 9A is a fragmentary front view of the liquid level sensor of FIG. 6, illustrating an example heat spike resulting from the pulsing of a heater, according to one example of the principles described herein.

FIG. 9B is a fragmentary front view of another liquid level sensor, illustrating an example heat spike resulting from the pulsing of a heater, according to one example of the principles described herein.

FIG. 9C is a sectional view of the liquid level sensor of FIG. 9B, illustrating the example heat spike resulting from the pulsing of the heater, according to one example of the principles described herein.

FIG. 10 is a graph illustrating different sensed temperature responses over time to a heater impulse, according to one example of the principles described herein.

FIG. 14 is a front view of a liquid level sensor, according to one example of the principles described herein.

FIG. 15 is a side view of the liquid level sensor of FIG. 14, according to one example of the principles described herein.

FIG. 16 is a flow diagram of a method for forming a liquid level sensor, according to one example of the principles described herein.

FIG. 17 is a front view of a panel upon which multiple liquid level sensors have been formed, prior to singulation, according to one example of the principles described herein.

Throughout the drawings, identical reference numbers designate similar, but not necessarily identical, elements.

DETAILED DESCRIPTION

Figure 3:
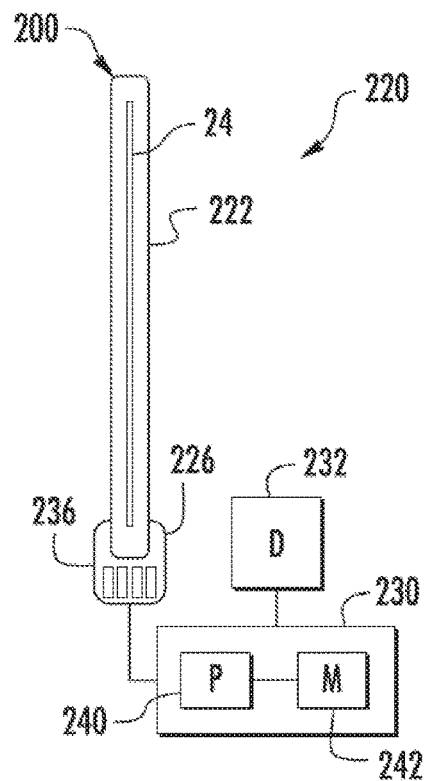
FIG. 3 is a diagram of a liquid level sensing system, according to one example of the principles described herein.

Liquid containers are used to hold various types of liquids. For example, in a printing system, an ink cartridge stores a volume of ink. This ink is passed to a printhead for deposition on a print medium to form text or images on the print medium.

As printing liquid is deposited on a print medium, the liquid container is depleted of printing liquid. Attempting to execute a printing operation when a liquid container is empty can result in damage to the printing device, the printhead, or the container itself. Moreover, print quality can suffer if printing is executed with a reduced amount of liquid in the container. Still further, it may be inconvenient to a consumer if a liquid container runs out of liquid and the consumer has not been able to adequately prepare, for example by purchasing additional liquid containers. Such consumer inconvenience can lead to customer dissatisfaction and loss of profits by a manufacturer of the container.

Accordingly, liquid level sensors can be used to detect the amount of liquid in a liquid container. Such sensors indicate a level of liquid in the liquid container in an attempt to provide helpful, accurate information regarding liquid levels, and in the case of a printing system, can be used to estimate how much printing can be performed given the present level of ink in an ink reservoir.

While such liquid level sensors can be helpful in indicating an amount of liquid, some characteristics reduce the sensors ability to accurately indicate a liquid level. For example, certain sensors enable only low-resolution analog liquid level sensing and support less efficient liquid level sensing methods. Moreover, many devices that are currently used to sense the level of a liquid within a volume may be relatively complex and expensive to manufacture. For example, some liquid level sensing devices utilize expensive componentry and expensive materials and also involve dedicated complex manufacturing processes.

The present specification describes various examples of liquid level sensors that are less expensive to manufacture. As will be described hereafter, in some examples, the disclosed liquid level sensor facilitates the use of materials having a wide range of temperature coefficient of resistance. In some examples, the disclosed liquid level sensors can sense the level of otherwise corrosive liquids without using generally more expensive corrosive resistant materials. Specifically, the liquid level sensors of the present specification implement a narrow liquid level sensing interface, less than 220 micrometers wide, Disposed on the narrow liquid level sensing interface are liquid level sensing components that detect a liquid level.

Specifically, the present specification describes a liquid level sensor. The liquid level sensor includes a carrier. A liquid level sensing interface is disposed on the carrier, the liquid level sensing interface has an aspect ratio of at least 1:50. A number of liquid level sensing components are disposed on the liquid level sensing interface. The number of liquid level sensing components detect a liquid level in a liquid container. Electrical interconnects output data collected from the number of sensing components.

The present specification also describes a method for forming a liquid level sensor. In the method, a high aspect ratio liquid level sensing interface is attached to a carrier. The high aspect ratio liquid level sensing interface is disposed in a recess of the carrier. The liquid level sensing interface has a number of liquid level sensing components disposed thereon. A driver is attached to the carrier. The driver outputs data collected from the number of liquid level sensing components. The number of liquid level sensing components are electrically coupled to the driver via the high aspect ratio liquid level sensing interface.

In another example, a liquid level sensor is described that includes a carrier to provide electrical connectivity between a number of liquid level sensing components and electrical interconnects and to provide mechanical protection of a liquid level sensing interface on which the number of liquid level sensing components are disposed. The liquid level sensor also includes a liquid level sensing interface disposed in a recess of the carrier. The liquid level sensing interface has an aspect ratio of at least 1:50, meaning the liquid level sensing interface is at least 50 times longer than it is wide. A number of liquid level sensing components are disposed on the liquid level sensing interface and detect a liquid level in a liquid container. A driver of the liquid level sensor outputs data collected from the number of liquid level sensing components to electrical interconnects. An encapsulant is disposed over a connection between the liquid level sensing interface and the driver. Electrical interconnects output data collected from the driver and a collar seals the liquid level sensor against a liquid container in which the liquid level sensor is inserted.

In one example, using such a sensor for sensing a liquid level 1) provides a low cost, high volume, and simple manufacturing process; 2) protects the small liquid level sensing interface; 3) provides a high resolution and high performance liquid level sensing platform; 4) supports multiple processes for detecting liquid levels; and 5) results in increased customer satisfaction due to the increased performance. However, it is contemplated that the devices disclosed herein may address other matters and deficiencies in a number of technical areas.

As used in the present specification and in the appended claims, the term "aspect ratio" refers to a width to length ratio of a component. For example, a liquid level sensing interface having an aspect ratio of at least 1:50 indicates that the length of the liquid level sensing interface is at least 50 times greater than the width of the liquid level sensing interface.

Further, as used in the present specification and in the appended claims, the term "a number of" or similar language is meant to be understood broadly as any positive number including 1 to infinity.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language indicates that a particular feature, structure, or characteristic described in connection with that example is included as described, but may not be included in other examples.

FIG. 1A illustrates an example liquid level sensing interface 24 for a liquid level sensor. Liquid level sensing interface 24 interacts with liquid 42 within a volume 40 and outputs signals that indicate the current level of liquid 42 within the volume 40. Such signals are processed to determine the level of liquid 42 within the volume 40. Liquid level sensing interface 24 facilitates the detection of the level of liquid 42 within the volume 40 in a low-cost manner.

As schematically shown by FIG. 1, liquid level sensing interface 24 comprises a strip 26, a series 28 of heaters 30 and a series 32 of sensors 34. The strip 26 includes an elongated strip that is to be extended into volume 40 containing the liquid 42. The strip 26 supports the heaters 30 and the sensors 34 such that a subset of the heaters 30 and sensors 34 are submersed within the liquid 42, when the liquid 42 is present.

In one example, the strip 26 is supported (from the top or from the bottom) such that those portions of the strip 26, and their supported heaters 30 and sensors 34, when submersed within a liquid 42, are completely surrounded on all sides by the liquid 42. In another example, the strip 26 is supported along a side of the volume 40 such that a face of the strip 26 adjacent the side of the volume 40 is not opposed by the liquid 42. In one example, the strip 26 has an elongated rectangular, substantially flat cross-section. In another example, the strip 26 has a different polygon cross-section or a circular or oval cross-section.

The heaters 30 are individual heating elements spaced along a length of the strip 26. Each of the heaters 30 is sufficiently close to a sensor 34 such that the heat emitted by the individual heater may be sensed by the associated sensor 34. In one example, each heater 30 is independently actuatable to emit heat independent of other heaters 30. In one example, each heater 30 is an electrical resistor. In one example, each heater 30 is to emit a heat pulse for duration of at least 10 μs with a power of at least 10 mW.

In the example illustrated, heaters 30 are employed to emit heat and do not serve as temperature sensors. As a result, each of the heaters 30 may be constructed from a wide variety of electrically resistive materials having a wide range of temperature coefficients of resistance. A resistor may be characterized by its temperature coefficient of resistance, or TCR. The TCR is the resistor's change in resistance as a function of the ambient temperature. TCR may be expressed in ppm/° C., which stands for parts per million per centigrade degree. The temperature coefficient of resistance is calculated as follows: temperature coefficient of a resistor: TCR=(R2−R1)e−6/R1*(T2−T1), where TCR is in ppm/° C., R1 is in ohms at room temperature, R2 is resistance at operating temperature in ohms, T1 is the room temperature in ° C. and T2 is the operating temperature in ° C.

Because the heaters 30 are separate and distinct from temperature sensors 34, a wide variety of thin-film material choices are available in wafer fabrication processes for forming the heaters 30. In one example, each of the heaters 30 has a relatively high heat dissipation per area, high temperature stability (TOR<1000 ppm/° C.), and an intimate coupling of heat generation to the surrounding medium and heat sensor. Suitable materials can be refractory metals and their respective alloys such as tantalum, and its alloys, and tungsten, and its alloys, to name a few; however, other heat dissipation devices like doped silicon or polysilicon may also be used.

Sensors 34 may be individual sensing elements spaced along the length of the strip 26. Each of the sensors 34 is sufficiently close to a corresponding heater 30 such that the sensor 34 may detect or respond to the transfer of heat from the associated or corresponding heater 30. Each of the sensors 34 outputs a signal which indicates or reflects the amount of heat transmitted to the particular sensor 34 following and corresponding to a pulse of heat from the associated heater 30. The amount of heat transmitted to the associated sensor 34 will vary depending upon the medium through which the heat was transmitted prior to reaching the sensor 34. For example, liquid has higher heat capacity than air so it will decrease the temperature detected by sensor 34. As a result, the differences between signals from the sensors 34 indicates the level of the liquid 42 within the volume 40.

In one example, each of the sensors 34 is a diode which has a characteristic temperature response. For example, in one example, each of the sensors 34 comprises a P-N junction diode. In other examples, other diodes may be employed or other temperature sensors may be employed.

In the example illustrated, the heaters 30 and sensors 34 are supported by the strip 26 so as to be interdigitated or interleaved amongst one another along the length of the strip 26. For purposes of this disclosure, the term "support" or "supported by with respect to heaters 30 and/or sensors 34 and a strip 26 indicates that the heaters 30 and/or sensors 34 are carried by the strip 26 such that the strip 26, heaters 20, and sensors 34 form a single connected unit. Such heaters 30 and sensors 34 may be supported on the outside or within and interior of the strip 26. For purposes of this disclosure, the term "interdigitated" or "interleaved" indicates that two items alternate with respect to one another. For example, interdigitated heaters 30 and sensors 34 may comprise a first heater, followed by a first sensor, followed by a second heater, followed by a second sensor and so on.

In one example, an individual heater 30 may emit pulses of heat that are to be sensed by multiple sensors 34 proximate to the individual heater 30. In one example, each sensor 34 is spaced no greater than 20 μm from an individual heater 30. In one example, sensors 34 have a minimum one-dimensional density along the strip 26 of at least 80 sensors 34 per inch (at least 40 sensors 34 per centimeter). In some examples, there may be at least 100 sensors 34 per inch along the strip 26. The one dimensional density includes a number of sensors 34 per unit measure in a direction along the length of the strip 26, the dimension of the strip 26 extending to different depths, defining the depth or liquid level sensing resolution of the liquid level sensing interface 24. In other examples, sensors 34 have other one dimensional densities along the strip 26. For example, in another example, the sensors 34 have a one-dimensional density along the strip 26 of at least 10 sensors per inch. In other examples, sensors 34 may have a one-dimensional density along the strip 26 on the order of 1000 sensors per inch (400 sensors per centimeter) or greater.

In some examples, the vertical density or number of sensors 34 per vertical centimeter or inch may vary along the vertical or longitudinal length of the strip 26. FIG. 1B illustrates an example sensor strip 126 having a varying density of sensors 34 along its major dimension i.e., its length. In the example illustrated, the sensor strip 126 has greater density of sensors 34 in those regions along the vertical height or depth that may benefit from a greater degree of depth resolution. In the example illustrated, the sensor strip 126 has a lower portion 127 having a first density of sensors 34 and an upper portion 129 having a second density of sensors 34, the second density being less than the first density. In such an example, the sensor strip 126 provides a higher degree of accuracy or resolution as the level of the liquid 42 within the volume 40 approaches an empty state. In one example, the lower portion 127 has a density of at least 40 sensors 34 per centimeter while the upper portion 129 has a density of less than 10 sensors per centimeter, and in one example, four sensors 34 per centimeter. In yet other examples, an upper portion or a middle portion of the sensor strip 126 may alternatively have a greater density of sensors as compared to other portions of the sensor strip 126.

Each of the heaters 30 and each of the sensors 34 are selectively actuatable under the control of a controller. In one example, the controller is part of or carried by the strip 26. In another example, the controller comprises a remote controller electrically connected to the heaters 30 on the strip 26. In one example, the liquid level sensing interface 24 is a separate component from the controller, facilitating replacement of the liquid level sensing interface 24 or facilitating the control of multiple liquid level sensing interfaces 24 by a separate controller.

FIG. 2 is a flow diagram of a method 100 that may be carried out using a liquid level sensing interface, such as liquid level sensing interface 24, to sense and determine the level of a liquid 42 within a volume 40. As indicated by block 102, control signals are sent to the heaters 30 causing a subset of heaters 30 or each of the heaters 30 to turn on and off so as to emit a heat pulse. In one example, control signals are sent to the heaters 30 such that the heaters 30 are sequentially actuated or turned on and off (pulsed) to sequentially emit pulses of heat. In one example, the heaters 30 are sequentially turned on and off in order, for example, in order from top to bottom along the strip 26 or from bottom to top along the strip 26.

In another example, the heaters 30 are actuated based upon a search operation, wherein the controller identifies which of the heaters 30 should be initially pulsed in an effort to reduce the total time or the total number of heaters 30 that are pulsed to determine the level of the liquid 42 within the volume 40. In one example, the identification of what heaters 30 are initially pulsed is based upon historical data. For example, the controller consults a memory device to obtain data regarding the last sensed level of the liquid 42 within the volume 40 and pulses those heaters 30 most proximate to the last sensed level of liquid 42 before pulsing other heaters 30 more distant from the last sensed level of liquid 42.

In another example, the controller predicts the current level of the liquid 42 within the volume 40 based upon the obtained last sensed level of liquid 42 and pulses those heaters 30 proximate to the predicted current level of liquid 42 within the volume 40 and not pulsing other heaters 30 more distant from the predicted current level of liquid 42. In one example, the predicted current level of liquid 42 is based upon the last sensed level of the liquid 42 and a lapse of time since the last sensing of the level of the liquid 42. In another example, the predicted current level of the liquid 42 is based upon the last sensed level of the liquid 42 and data indicating the consumption or withdrawal of liquid 42 from the volume 40. For example, in circumstances where the liquid level sensing interface 24 is sensing the volume of an ink in an ink supply, the predicted current level of liquid 42 may be based upon last sensed level of liquid 42 and data such as the number of pages printed using the ink or the like.

In yet another example, the heaters 30 may be sequentially pulsed, wherein heaters 30 proximate to a center of the depth range of volume 40 are initially pulsed and wherein the other heaters 30 are pulsed in the order based upon their distance from the center of the depth range of the volume 40. In yet another example, subsets of the heaters 30 are concurrently pulsed. For example, a first heater and a second heater may be concurrently pulsed where the first heater and the second heater are sufficiently spaced from one another along the strip 26 such that the heat emitted by the first heater is not transmitted or does not reach the sensor 34 intended to sense transmission of heat from the second heater. Concurrently pulsing heaters 30 may reduce the total time for determining the level of liquid 42 within the volume 40.

In one example, each heat pulse has a duration at least 10 μs and has a power of at least 10 mW. In one example, each heat pulse has a duration of between 1 and 100 μs and up to a millisecond. In one example, each heat pulse has a power of at least 10 mW and up to and including 10 W.

As indicated by block 104 in FIG. 2, for each emitted pulse, an associated sensor 34 senses the transfer of heat from the associated heater 30 to the associated sensor 34. In one example, each sensor 34 is actuated, turned on or polled following a predetermined period of time after the pulse of heat from the associated heater 30. The period of time may be based upon the beginning of the pulse, the end of the pulse or some other time value related to the timing of the pulse. In one example, each sensor 34 senses heat transmitted from the associated heater 30 beginning at least 10 μs following the end of the heat pulse from the associated heater 30. In one example, each sensor 34 senses heat transmitted from the associated heater 30 beginning 1000 μs following the end of the heat pulse from the associated heater 30. In another example, the sensor 34 initiates the sensing of heat after the end of the heat pulse from the associated heater 30 following a period of time equal to a duration of the heat pulse, wherein such sensing occurs for a period of time of between two to three times the duration of the heat pulse. In yet other examples, the time delay between the heat pulse and the sensing of heat by the associated sensor 34 may have other values.

As indicated by block 106 in FIG. 2, the controller or another controller determines a level of the liquid 42 within the volume 40 based upon the sensed transfer of heat from each emitted pulse. For example, liquid has higher heat capacity than air so it will decrease the temperature detected by sensor 34. If the level of liquid 42 within the volume 40 is such that liquid 42 is extending between a particular heater 30 and its associated sensor 34, heat transfer from the particular heater 32 to the associated sensor 34 will be less as compared to circumstances where air is extending between the particular heater 30 and its associated sensor 34. Based upon the amount of heat sensed by the associated sensor 34 following the emission of the heat pulse by the associated heater 30, the controller determines whether air or liquid is extending between the particular heater 30 and the associated sensor 34. Using this determination and the known location of the heater 30 and/or sensor 34 along the strip 26 and the relative positioning of the strip 26 with respect to the floor of the volume 40, the controller determines the level of liquid 42 within the volume 40. Based upon the determined level of liquid 42 within the volume 40 and the characteristics of the volume 40, the controller is further able to determine the actual volume or amount of liquid remaining within the volume 40.

In one example, the controller determines the level of liquid 42 within the volume 40 by consulting a lookup table stored in a memory, wherein the look of table associates different signals from the sensors 34 with different levels of liquid 42 within the volume 40. In yet another example, the controller determines the level of liquid 42 within the volume 40 by utilizing signals from the sensors 34 as input.

In some examples, the method 100 and liquid level sensing interface 24 may be used to not only determine an uppermost level or top surface of liquid within the volume 40, but also determine different levels of different liquids concurrently residing in the volume 40. For example, due to different densities or other properties, different liquids may layer upon one another while concurrently residing in a single volume 40. Each of such different liquids may have a different heat transfer characteristic. In such an application, the method 100 and liquid level sensing interface 24 may be used to identify where the layer of a first liquid ends within the volume 40 and where the layer of a second different liquid, underlying or overlying the first liquid, begins.

In one example, the determined level (or levels) of liquid within the volume 40 and/or the determined volume or amount of liquid within the volume 40 is output through a display or audible device. In yet other examples, the determined level of liquid 42 or the volume of liquid is used as a basis for triggering an alert, warning or the like to user. In some examples, the determined level of liquid 42 or volume of liquid is used to trigger the automatic reordering of replenishment liquid or the closing of a valve to stop the inflow of liquid into the volume 40. For example, in printers, the determined level of liquid 42 within the volume 40 may automatically trigger reordering of the replacement ink cartridge or replacement ink supply.

FIG. 3 is a diagram of a liquid level sensing system 220, according to one example of the principles described herein. The liquid level sensing system 220 includes a carrier 222, a liquid level sensing interface 24, an electrical interconnect 226, a controller 230 and a display 232. The carrier 222 has a structure that supports the strip 26. In one example, the carrier 222 is a strip formed from, or that includes, a polymer, glass or other material. In one example, the carrier 222 has embedded electrical traces or conductors. For example, the carrier 222 may include composite material having woven fiberglass cloth with an epoxy resin binder. In one example, the carrier 222 is a glass-reinforced epoxy laminate sheet, tube, rod or printed circuit board.

The liquid level sensing interface 24, described above, extends along a length of the carrier 222. In one example, the liquid level sensing interface 24 is glued, bonded or otherwise affixed to the carrier 222.

The electrical interconnect 226 is an interface by which signals from the sensors 34 (shown in FIG. 1) of the liquid level sensing interface 24 are transmitted to the controller 230. In one example, the electrical interconnect 226 has electrical contact pads 236. In other examples, the electrical interconnect 226 may have other forms. The electrical interconnect 226, carrier 222 and strip 24, collectively, form a liquid level sensor 200 that may be incorporated into and fixed as part of a liquid container volume or may be a separate portable sensing device which may be manually inserted into different liquid containers or volumes.

The controller 230 includes a processing unit 240 and associated non-transient computer-readable medium or memory 242. In one example, the controller 230 is separate from the liquid level sensor 200. In other examples, the controller 230 is incorporated as part of the liquid level sensor 200. The processing unit 240 files instructions contained in memory 242. For purposes of this application, the term "processing unit" refers to a processing unit that executes sequences of instructions contained in memory. Execution of the sequences of instructions causes the processing unit to perform operations such as generating control signals. The instructions may be loaded in a random access memory (RAM) for execution by the processing unit from a read only memory (ROM), a mass storage device, or some other persistent storage. In other examples, hard wired circuitry may be used in place of or in combination with instructions to implement the functions described. For example, controller 230 may be embodied as part of at least one application-specific integrated circuits (ASICs). Unless otherwise specifically noted, the controller is not limited to any specific combination of hardware circuitry and software, nor to any particular source for the instructions executed by the processing unit.

The processing unit 240, following instructions contained in memory 242 carries out the method 100 shown and described above with respect to FIG. 2. The processor 240, following instructions provided in memory 242, selectively pulses the heaters 30. The processor 240, following instructions provided in memory 242, obtains data signals from the sensors 34, or in the data signals indicate dissipation of heat from the pulses and the transfer of heat to the sensors 34. The processor 240, following instructions provided in memory 242, determines a level of liquid 42 within the volume 40 based upon the signals from the sensors 34. As noted above, in some examples, the controller 230 may additionally determine an amount or volume of liquid using characteristics of the volume or chamber containing a liquid.

In one example, the display 232 receives signals from the controller 230 and presents visible data based upon the determined level of liquid 42 and/or determined volume or amount of liquid within the volume 40. In one example, the display 232 presents an icon or other graphic depicting a percentage of the volume 40 that is filled with the liquid 42. In another example, the display 232 presents an alphanumeric indication of the level of liquid 42 or percent of the volume 40 that is filled with the liquid 42 or that has been emptied of the liquid 42. In yet another example, the display 232 presents an alert or "acceptable" status based on the determined level liquid 42 within the volume 40. In yet other examples, the display 232 may be omitted, wherein the determined level of liquid 42 within the volume 40 is used to automatically trigger an event such as the reordering of replenishment liquid, the actuation of a valve to add a liquid 42 to the volume 40 or the actuation of valve to terminate the ongoing addition of liquid 42 to the volume 4.

Figure 4:
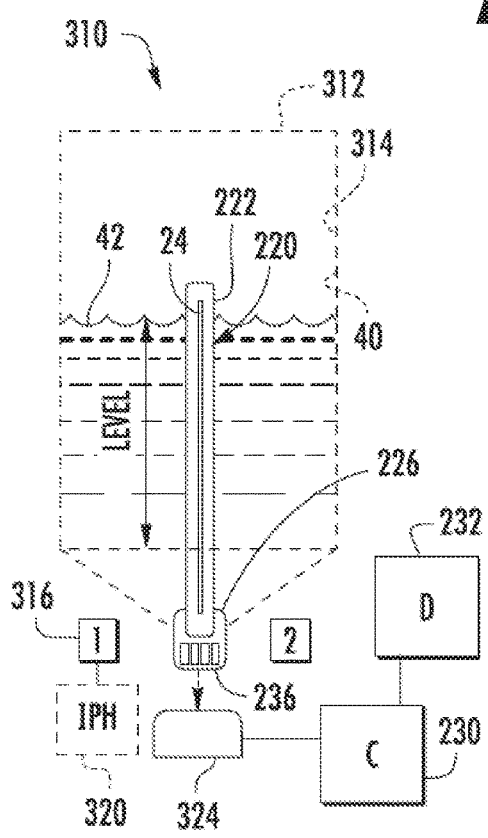
FIG. 4 is a diagram of a liquid supply system including the liquid level sensing system of FIG. 3, according to one example of the principles described herein.

FIG. 4 is a diagram of a liquid supply system 310 including the liquid level sensing system 220 of FIG. 3, according to one example of the principles described herein. The liquid supply system 310 includes a liquid container 312, a chamber 314 and fluid or liquid ports 316. The container 312 defines the chamber 314. The chamber 314 forms an example volume 40 in which liquid 42 is contained. As shown by FIG. 4, the carrier 222 and the liquid level sensing interface 24 project into the chamber 314 from a bottom side of the chamber 314, facilitating liquid level determinations as the chamber 314 nears a state of being completely empty. In other examples, the carrier 222 of the liquid level sensing interface 24 may alternatively be suspended from a top of the chamber 314.

Liquid ports 316 include liquid passes by which liquid 42 from within the chamber 314 is delivered or directed to an external recipient. In one example, the liquid ports 316 have a valve or other mechanism facilitating selective discharge of liquid 42 from the chamber 314. In one example, the liquid supply system 310 is an off-axis ink supply for a printing system. In another example, the liquid supply system 310 additionally has a print head 320 which is fluidly coupled to the chamber 314 and receives liquid 42 from the chamber 314 through the liquid level sensing interface 24. For purposes of this disclosure, the term "fluidly coupled" indicates that two or more fluid transmitting volumes are connected directly to one another or are connected to one another by intermediate volumes or spaces such that fluid may flow from one volume into the other volume.

In the example illustrated in FIG. 4, communication between the controller 230, which is remote or separate from the liquid supply system, is facilitated via a wiring connector 324 such as a universal serial bus connector or other type of connector. The controller 230 and the display 232 operate as described above.

Figure 5:
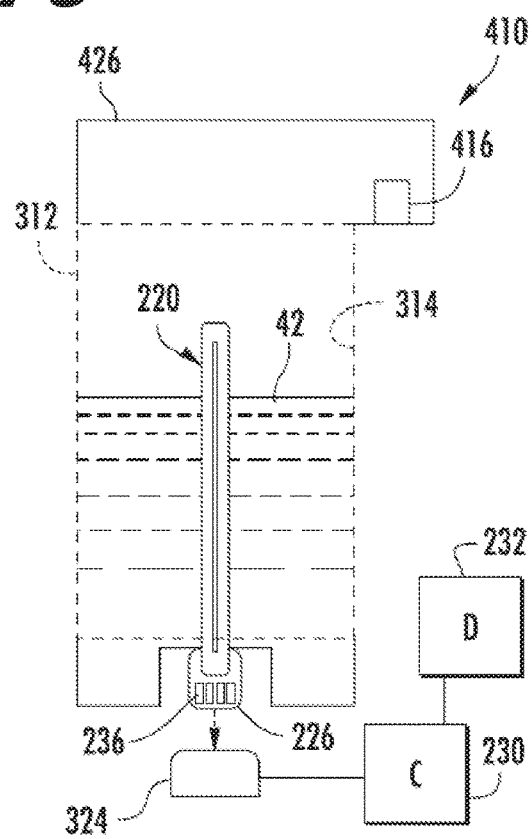
FIG. 5 is a diagram of a liquid supply system including the liquid level sensing system of FIG. 3, according to another example of the principles described herein.

FIG. 5 is a diagram of a liquid supply system 410 including the liquid level sensing system 220 of FIG. 3, according to one example of the principles described herein. The liquid supply system 410 is similar to the liquid supply system 310 except that the liquid supply system 410 has a liquid port 416 in place of the liquid port 316. The liquid port 416 is similar to liquid port 316 except that the liquid port 416 is provided in a cap 426 above the chamber 314 of the container 312. Those remaining components of the liquid supply system 410 which correspond to components of the system 310 are numbered similarly.

FIGS. 6-8 illustrate a liquid level sensor 500, which is one example of the liquid level sensor 200, according to examples of the principles described herein. Specifically, FIG. 6 is a diagram of a portion of the liquid level sensing interface 224, FIG. 7 is a circuit diagram of the liquid level sensor 500, and FIG. 8 is a sectional view of the liquid level sensing interface 224 of FIG. 6, taken along line 8-8. As shown in FIG. 6, the liquid level sensing interface 224 is similar to the liquid level sensing interface 24 described above in that the liquid level sensing interface 224 has a strip 26 which supports a series of heaters 530 and a series of temperature sensors 534. In the example illustrated, the heaters 530 and the temperature sensors 534 are interdigitated or interleaved along the length L of the strip 26, wherein the length L is the major dimension of the strip 26 to extend across different depths when the liquid level sensor 500 is being used. In the example illustrated, each sensor 534 is spaced from its associated or corresponding heater 530 by a spacing distance S, as measured in a direction along the length L, of less than or equal to 20 μm and nominally 10 μm. In the example illustrated, the sensors 534 and their associated heaters 530 are arranged in pairs, wherein the heaters 530 of adjacent pairs are separated from one another by a distance D, as measured in a direction along the length L of at least 25 μm to reduce thermal cross talk between consecutive heaters. In one example, consecutive heaters 530 are separated from one another by a distance D of between 25 μm and 2500 μm, and nominally 100 μm.

As shown in FIG. 7, in the example illustrated, the heaters 530 may be an electrical resistor 550 which may be selectively turned on and off through the selective actuation of a transistor 552. Each sensor 534 may be a diode 560. In one example, a diode 560, serving as a temperature sensor, is a P-N junction diode. Each diode 560 has a characteristic response to changes in temperature. In particular, each diode 560 has a forward voltage that changes in response to changes in temperature. A diode 560 exhibits a nearly linear relationship between temperature and applied voltage. Because the temperature sensors 530 include diodes or semiconductor junctions, the sensor 500 has a lower cost and they can be fabricated upon the strip 26 using semiconductor fabrication techniques.

FIG. 8 is a sectional view of a portion of one example of a liquid level sensor 500. In the example illustrated, the strip 26 is supported by the carrier 222 (described above). In one example, the strip 26 is silicon while the carrier 222 comprises a polymer or plastic. In the example illustrated, a heater 530 is a polysilicon heater which is supported by the strip 26, but separated from the strip 26 by an electrically insulating layer 562, such as a layer of silicon dioxide. In the example illustrated, the heater 530 is further encapsulated by an outer passivation layer 564 which inhibits contact between the heater 530 and the liquid being sensed. The passivation layer 564 protects the heater 530 and sensors 534 from damage that would otherwise result from corrosive contact with the liquid or ink being sensed. In one example, the outer passivation layer 564 is silicon carbide and/or tetraethyl orthosilicate (TEOS). In other examples, the layers 562, 564 may be omitted or may be formed from other materials.

As shown in FIGS. 7 and 8, the construction of the liquid level sensor 500 creates various layers or barriers providing additional thermal resistances R. The pulse of heat emitted by a heater 530 is transmitted across such thermal resistances to the associated sensor 534. The rate at which the heat from a particular heater 530 is transmitted to the associated sensor 534 varies depending upon whether the particular heater 530 is bordered by air 41 or liquid 42. Signals from the sensor 534 will vary depending upon whether they were transmitted across air 41 are liquid 42. Differences signals are used to determine the current level of liquid within a volume.

FIGS. 9A, 9B and 9C are views of the liquid level sensing interfaces 624 and 644, which are other examples of the liquid level sensing interface 24. In FIG. 9A, heaters 30 and sensors 34 are arranged in pairs labeled 0, 1, 2, . . . N. The liquid level sensing interface 624 is similar to the liquid level sensing interface 24 except that rather than being interleaved or interdigitated vertically along the length of the strip 26, the heaters 30 and the sensors 34 are arranged in an array of side-by-side pairs vertically along the length of the strip 26.

FIGS. 9B and 9C are views of the liquid level sensing interface 644, another example of the liquid level sensing interface 24. The liquid level sensing interface 644 is similar to the liquid level sensing interface 24 except that the heaters 30 and sensors 34 are arranged in an array of stacks vertically spaced along the length of the strip 26. FIG. 9C is a sectional view of the liquid level sensing interface 644 taken along line 9C-9C further illustrating the stacked arrangement of the pairs of heaters 30 and sensors 34.

FIGS. 9A-9C additionally illustrate an example of pulsing of the heater 30 of heater/sensor pair 1 and the subsequent dissipation of heat through the adjacent materials. In FIGS. 9A-9C, the temperature or intensity of the heat dissipates or declines as the heat travels further away from the source of the heat, i.e., the heater 30 of heater/sensor pair 1. The dissipation of heat is illustrated by the change in cross-hatching in FIGS. 9A-9C.

FIG. 10 is a graph illustrating different sensed temperature responses over time to a heater impulse, according to one example of the principles described herein. FIG. 10 illustrates a pair of time synchronized graphs of the example pulsing shown in FIGS. 9A-9C. FIG. 10 illustrates the relationship between the pulsing of the heater 30 of heater sensor pair 1 and the response over time by sensors 34 of heater/sensor pairs 0, 1 and 2. As shown in FIG. 10, the response of each of the sensors 34 of each pairs 0, 1 and 2 varies depending upon whether air or liquid is over or adjacent to the respective heater/sensor pair 0, 1 and 2. The characteristic transient curve and magnitude scale differently in the presence of air versus the presence of liquid. As a result, signals from the liquid level sensing interface 644, as well as other interfaces such as the liquid level sensing interfaces 24 and 624, indicate the level of liquid 42 within the volume 40.

In one example, a controller, such as the controller 230 described above, determines a level of liquid within the sensed volume by individually pulsing the heater 30 of a pair and comparing the magnitude of the temperature, as sensed from the sensor 34 of the same pair, relative to the heater 30 pulsing parameters to determine whether liquid 42 or air 41 is adjacent to the individual heater/sensor pair. The controller 230 carries out such pulsing and sensing for each pair of the array until the level of the liquid 42 within the sensed volume 40 is found or identified. For example, the controller 230 may first pulse the heater 30 of pair 0 and compare the sensed temperature provided by the sensor 34 of pair 0 to a predetermined threshold. Thereafter, the controller 230 may pulse the heater 30 of pair 1 and compare the sensed temperature provided by the sensor 34 of pair 1 to a predetermined threshold. This process is repeated until the level of the liquid 42 is found or identified.

In another example, a controller, such as the controller 230 described above, determines a level of liquid 42 within the sensed volume 40 by individually pulsing the heater 30 of a pair and comparing multiple magnitudes of temperature as sensed by the sensors 34 of multiple pairs. For example, the controller 230 may pulse the heater 30 of pair 1 and thereafter compare the temperature sensed by the sensor 34 of pair 1, the temperature sensed by the sensor 34 of pair 0, the temperature sensed by the sensor 34 of pair 2, and so on, each temperature resulting from the pulsing of the heater 30 of pair 1. In one example, the controller may utilize the analysis of the multiple magnitudes of temperature from the different sensors 34 vertically along the liquid level sensing interface 24, resulting from a single pulse of heat, to determine whether liquid 42 or air 41 is adjacent to the heater sensor pair having the heater 30 that was pulsed. In such an example, the controller 230 carries out such pulsing and sensing by separately pulsing the heater 30 of each pair of the array and analyzing the resulting corresponding multiple different temperature magnitudes until the level of the liquid 42 within the sensed volume 40 is found or identified.

In another example, the controller may determine the level of liquid 42 within the sensed volume 40 based upon the differences in the multiple magnitudes of temperature vertically along the liquid level sensing interface 24 resulting from a single heat pulse. For example, if the magnitude of temperature of a particular sensor 34 drastically changes with respect to the magnitude of temperature of an adjacent sensor 34, the drastic change may indicate that the level of liquid 42 is at or between the two sensors 34. In one example, the controller may compare differences between the temperature magnitudes of adjacent sensors 34 to a predefined threshold to determine whether the level of liquid 42 is at or between the known vertical locations of the two sensors 34.

In yet other examples, a controller, such as the controller 230 described above, determines the level of liquid 42 within the sensed volume 40 based upon the profile of a transient temperature curve based upon signals from a single sensor 34 or multiple transient temperature curves based upon signals from multiple sensors 34. In one example, a controller, such as the controller 230 described above, determines a level of liquid 42 within the sensed volume 40 by individually pulsing the heater 30 of a pair and comparing the transient temperature curve, produced by the sensor 34 of the same pair, relative to the predefined threshold or a predefined curve to determine whether liquid 42 or air 41 is adjacent to the individual heater/sensor pair. The controller 230 carries out such pulsing and sensing for each pair of the array until the level of the liquid 42 within the sensed volume 40 is found or identified. For example, the controller 230 may first pulse the heater 30 of pair 0 and compare the resulting transient temperature curve produced by the sensor 34 of pair 0 to a predetermined threshold or predefined comparison curve. Thereafter, the controller 230 may pulse the heater 30 of pair 1 and compare the resulting transient temperature curve produced by the sensor 34 of pair 1 to a predetermined threshold or predefined comparison curve. This process is repeated until the level of the liquid 42 is found or identified.

In another example, a controller, such as the controller 230 described above, determines a level of liquid 42 within the sensed volume 40 by individually pulsing the heater 30 of a pair and comparing multiple transient temperature curves produced by the sensors of multiple pairs. For example, the controller 230 may pulse the heater 30 of pair 1 and thereafter compare the resulting transient temperature curve produced by the sensor 34 of pair 1, the resulting transient temperature curve produced by the sensor 34 of pair 0, the resulting transient temperature curve produced by the sensor 34 of pair 2, and so on, each transient temperature curve resulting from the pulsing of the heater 30 of pair 1. In one example, the controller may utilize the analysis of the multiple transient temperature curves from the different sensors 34 vertically along the liquid level sensing interface 24, resulting from a single pulse of heat, to determine whether liquid 42 or air 41 is adjacent to the heater sensor pair having the heater 30 that was pulsed. In such an example, the controller 230 carries out such pulsing and sensing by separately pulsing the heater 30 of each pair of the array and analyzing the resulting corresponding multiple different transient temperature curves until the level of the liquid 42 within the sensed volume 40 is found or identified.

In another example, the controller may determine the level of liquid 42 within the sensed volume 40 based upon the differences in the multiple transient temperature curves produced by different sensors 34 vertically along the liquid level sensing interface 24 resulting from a single heat pulse. For example, if the transient temperature curve of a particular sensor 34 drastically changes with respect to the transient temperature curve of an adjacent sensor 34, the drastic change may indicate that the level of liquid 42 is at or between the two sensors 34. In one example, the controller may compare differences between the transient temperature curves of adjacent sensors 34 to a predefined threshold to determine whether the level of liquid 42 is at or between the known vertical locations of the two sensors 34.

Figure 11:
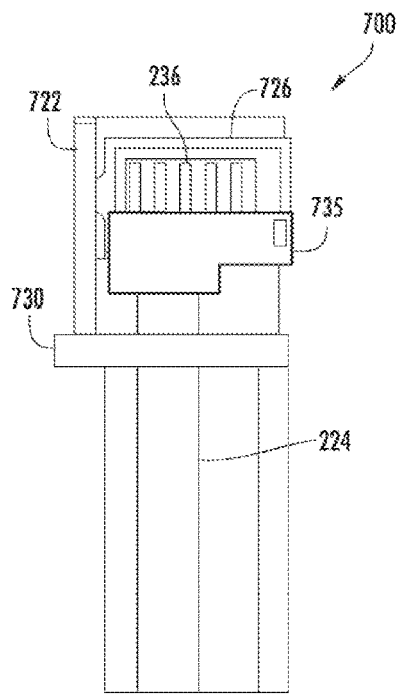
FIG. 11 is a diagram of a liquid level sensor, according to one example of the principles described herein.
Figure 12:
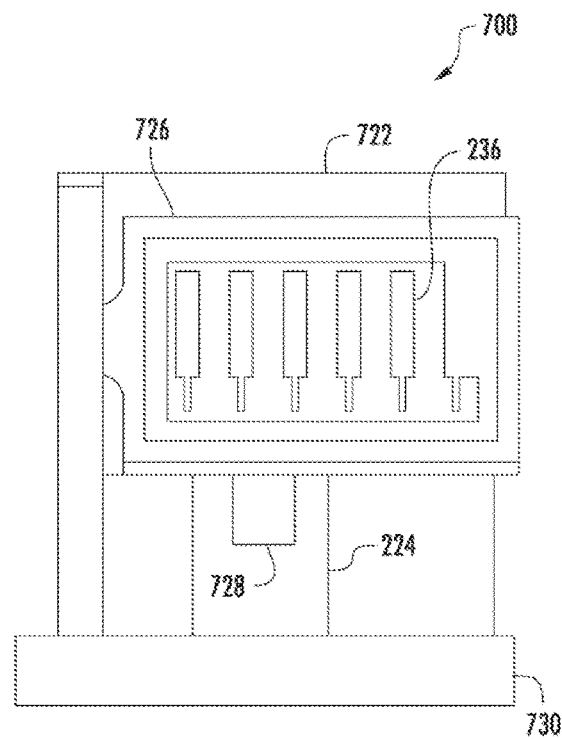
FIG. 12 is an enlarged view of a portion of the liquid level sensor of FIG. 11, according to one example of the principles described herein.

FIGS. 11 and 12 are diagrams of a liquid level sensor 700, which is an example of the liquid level sensor 500, according to one example of the principles described herein. The liquid level sensor 700 includes a carrier 722, a liquid level sensing interface 224, an electrical interface 726, a driver 728 and collar 730. The carrier 722 is similar to the carrier 222 described above. In the example illustrated, the carrier 722 is a molded polymer. In other examples, the carrier 722 may comprise a glass or other materials.

The liquid level sensing interface 224 is described above. The liquid level sensing interface 224 is bonded, glued or otherwise adhered to a face of the carrier 722 along the length of the carrier 722. The carrier 722 may be formed from, or comprise, glass, polymers, FR4 or other materials.

The electrical interconnect 226 includes a printed circuit board having electrical contact pads 236 for making an electrical connection with the controller 230 (described above with respect to FIGS. 3-5). In the example illustrated, the electrical interconnect 226 is bonded or otherwise adhered to the carrier 722. The electrical interconnect 226 is electrically connected to the driver 728 as well as the heaters 530 and sensors 534 of the liquid level sensing interface 224. The driver 728 may be an application-specific integrated circuit (ASIC) which drives the heaters 530 and the sensors 534 in response to signals received through the electrical interconnect 726. In other examples, the driving of the heaters 530 and the sensing by the sensors 534 may alternatively be controlled by a fully integrated driver circuit in lieu of an ASIC.

The collar 730 extends about the carrier 722. The collar 730 serves as a supply integration interface between the carrier 722 and the liquid container in which the sensor 700 is used to detect a level of a liquid 42 within a volume 40. In some examples, the collar 730 provides a liquid seal, separating liquid 42 contained within the volume 40 that is being sensed and the electrical interconnect 726. As shown in FIG. 11, in some examples, the driver 728 as well as the electrical connections between the driver 728, the liquid level sensing interface 224 and the electrical interconnect 726 are further covered by a protective electrically insulating wire bond adhesive or encapsulant 735 such as a layer of epoxy mold compound.

Figure 13:
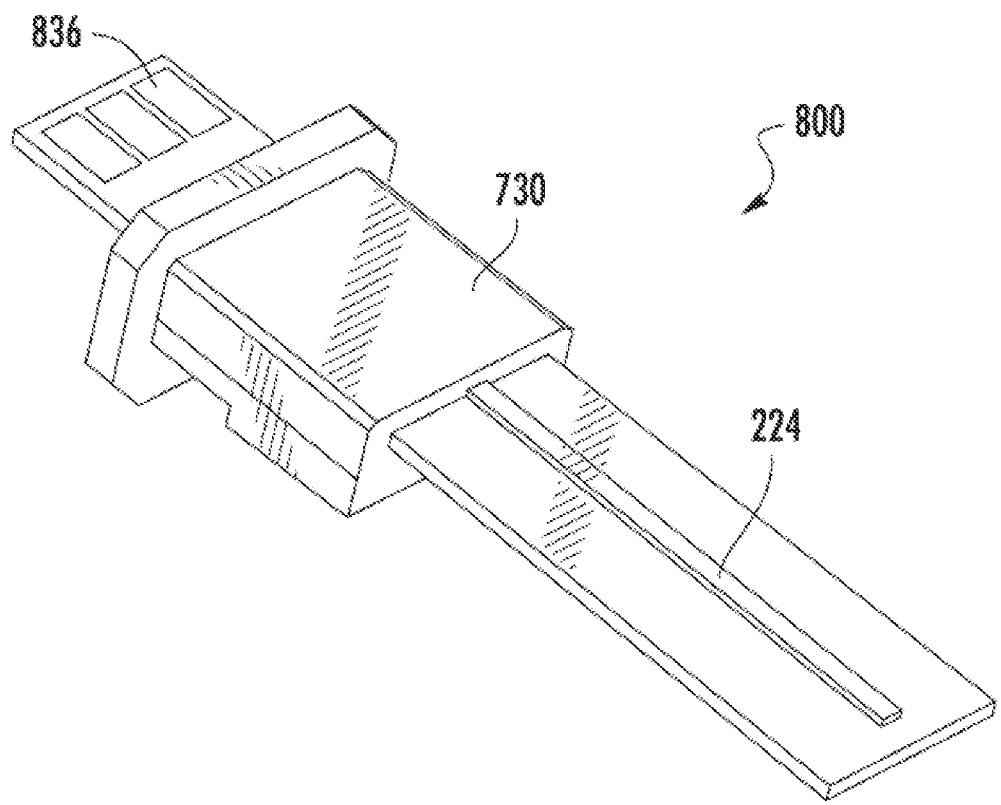
FIG. 13 is a perspective view of a liquid level sensor, according to one example of the principles described herein.

FIGS. 13-15 are views of a liquid level sensor 800, another example of the liquid level sensor 500, according to one example of the principles described herein. The liquid level sensor 800 is similar to the liquid level sensor 700 except that liquid level sensor 800 includes the carrier 822 in place of the carrier 722 and omits the electrical interconnect 726. The carrier 822 is a printed circuit board or other structure having embedded electrical traces and contact pads to facilitate electrical connection between various electronic components mounted upon the carrier 822. In one example, the carrier 822 is a composite material of woven fiberglass cloth with an epoxy resin binder. In one example, the carrier 822 is a glass-reinforced epoxy laminate sheet, tube, rod or printed circuit board, such as an FR4 printed circuit board.

As shown in FIGS. 14 and 15, the liquid level sensing interface 224 is easily bonded to the carrier 822 by a die attach adhesive 831. The liquid level sensing interface 224 is further wire bonded to the acumen or driver 728 and the electrical contact pads 836 are provided as part of the carrier 822. The encapsulant 735 overlays or covers the wire bonds between the liquid level sensing interface 224, the driver 728 and the electrical contact pads 836. As shown in FIG. 13, the collar 730 is positioned about the encapsulant 735 between a lower end of the liquid level sensing interface 224 and the electrical contact pads 836.

Figure 18A:
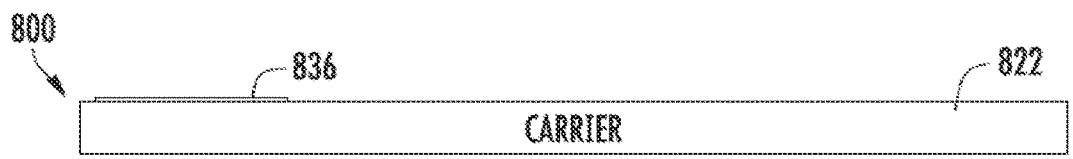
FIGS. 18A-18E are side views illustrating the formation of a liquid level sensor as it is being formed, according to one example of the principles described herein.
Figure 18B:
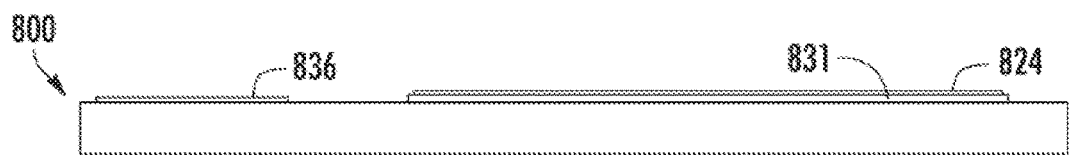

FIGS. 16, 17 and 18A-18E illustrate the formation of the liquid level sensor 800, according to one example of the principles described herein. Specifically, FIG. 16 illustrates a method 900 for forming the liquid level sensor 800. As indicated by block 902, the liquid level sensing interface 224 is attached to the carrier 822. As indicated by block 904, the driver 728 is also attached to the carrier 822. FIG. 18A illustrates the carrier 822 prior to the attachment of the liquid level sensing interface 224 and the driver 728. FIG. 188 illustrates the liquid level sensor 800 after the attachment of the liquid level sensing interface 224 and driver 728 (shown in FIG. 14) with the adhesive layer 831. In one example, the adhesive layer 831 is stamped upon the carrier 822 to precisely locate the adhesive 831. In one example, the attachment of the liquid level sensing interface 824 and the driver 728 further includes curing of the adhesive.

Figure 18C:
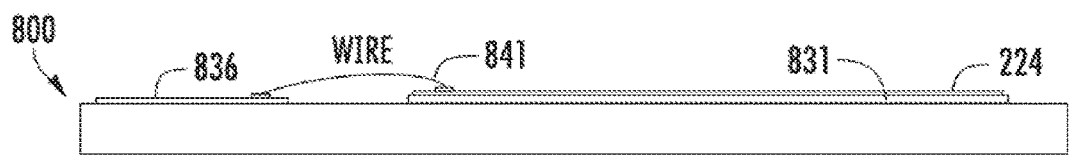
Figure 18D:
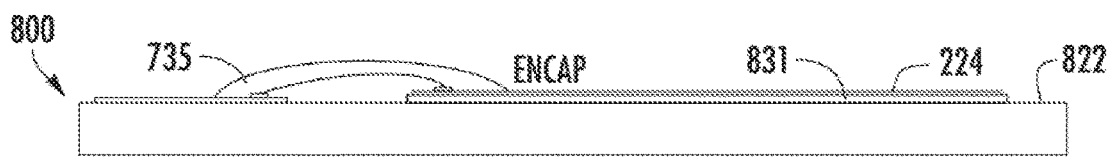
Figure 18E:
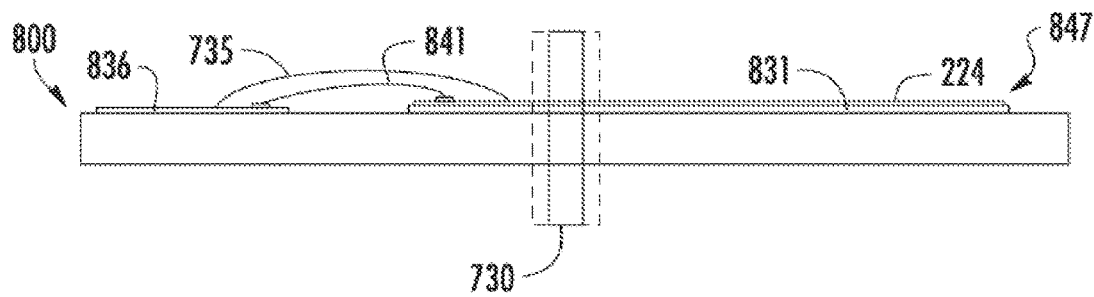

As indicated by block 906 of FIG. 16, the liquid level sensing interface 224 is wire bonded to the electrical contact pads 836 of the carrier 822 serving as an electrical interconnect. As indicated by block 908 in FIG. 16, the wire bonds 841 shown in FIG. 18C are then encapsulated with an encapsulant 735. In one example, the encapsulant 735 is cured. As shown in FIG. 17, in one example, multiple liquid level sensors 800 may be formed as part of a single panel 841. For example, a single FR4 panel having electrically conductive traces and contact pads for multiple liquid level sensors 800 may be used as a substrate upon which the liquid level sensing interfaces 224, drivers 728, and encapsulant 735 may be formed. As indicated by block 910 of FIG. 16, in such an example, the individual liquid level sensors 800 are singulated from the panel. As illustrated by FIG. 18E, in applications where the liquid level sensor 800 is to be incorporated as part of a liquid or fluid supply, the collar 730 is further secured to the carrier 822 between the wire bonds 841 and the lower end 847 of the liquid level sensing interface 224. In one example, collar 730 is adhesively bonded to the carrier 822 by an adhesive that is subsequently cured.

Figure 19:
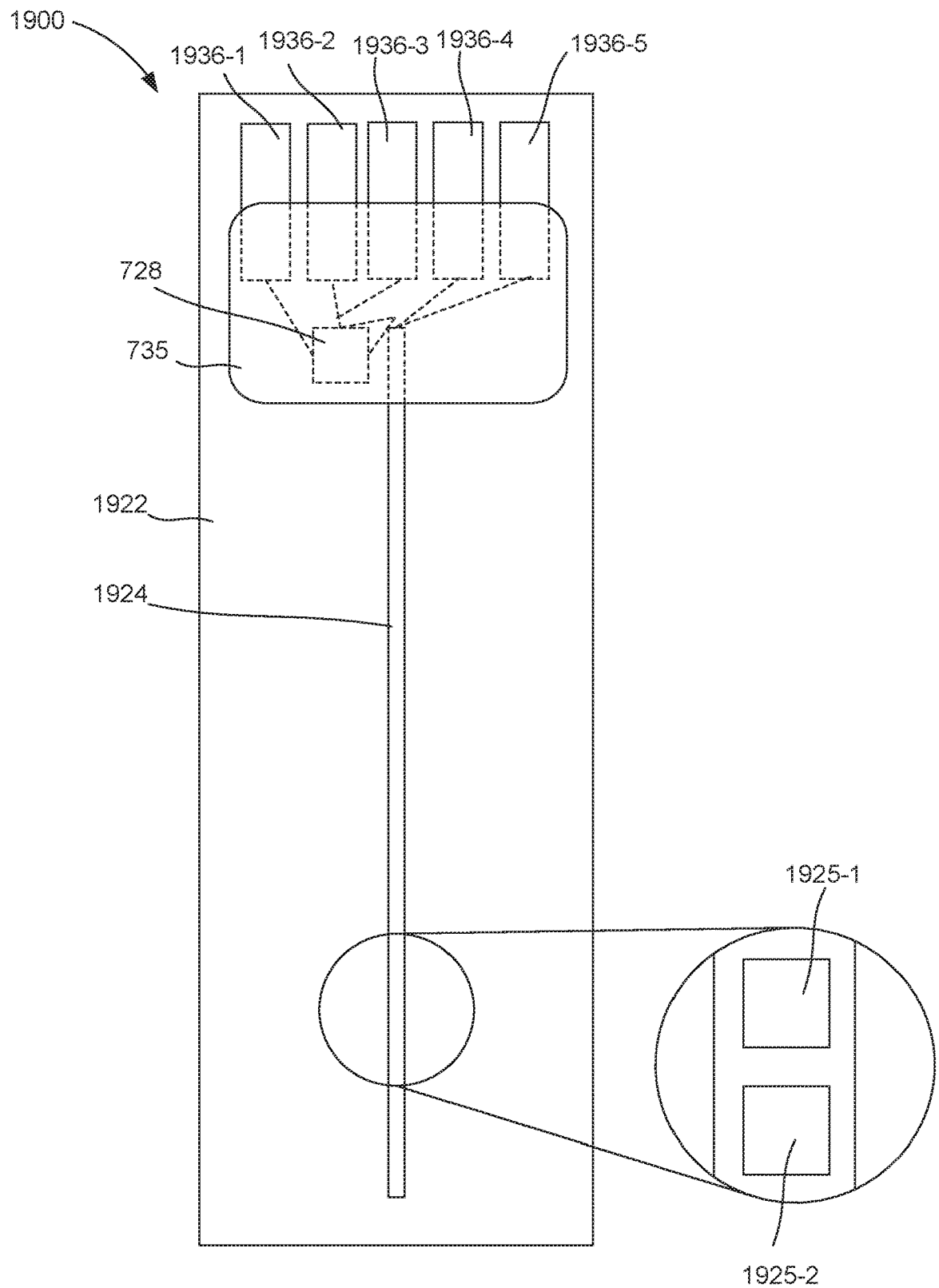
FIG. 19 is a top view of a liquid level sensor, according to one example of the principles described herein.

FIG. 19 is a top view of a liquid level sensor 1900, according to one example of the principles described herein. As described above, the liquid level sensor 1900 includes a carrier 1922. The carrier 1922 may be similar to the carriers described above. That is, the carrier 1922 may be a rigid component, such as a printed circuit board, that provides electrical connectivity between a liquid level sensing interface 1924 and an electrical interconnect. In a specific example, the carrier 1922 is a printed circuit board that has a double clad single core with plated through holes. Such through holes are used to bring the electrical contact pads 1936 to the same side of the carrier 1922 as the sliver liquid level sensing interface 1924.

In some examples, the electrical interconnect includes a number of electrical contact pads 1936 that may be similar to previously described electrical contact pads. The electrical interconnect, i.e., the electrical contact pads 1936, collect data from a number of sensing components 1925 that are disposed on the liquid level sensing interface 1924.

In some examples, the liquid level sensing interface 1924 is a sliver die that has a high aspect ratio. As described above, the aspect ratio describes a width and length relationship of the liquid level sensing interface 1924. In this example, the liquid level sensing interface 1924 may have an aspect ratio of at least 1:50. In other words, the length of the liquid level sensing interface 1924 may be 50 times longer than a width of the liquid level sensing interface 1924. In a further example, the aspect ratio of width to length may be at least 1:80. In yet another example, the aspect ratio of width to length may be at least 1:100. In other words, the width of the liquid level sensing interface 1924 may be two orders of magnitude smaller than the length of the liquid level sensing interface 1924. As a specific numeric example, the liquid level sensing interface 1924 may be less than 220 micrometers wide and longer than 22 millimeters. In some examples, the liquid level sensing interface 1924 is a sliver die that is thin, for example, less than 220 micrometers wide.

Using such a thin liquid level sensing interface 1924 allows for enhanced silicon die separation ratios, reduces or minimizes silicon slotting costs, reduces or minimizes the fan-out chiclets, and avoids many process integration issues. Moreover, the sliver liquid level sensing interface 1924 offers precise control over the liquid level sensing interface 1924 geometry and liquid level sensing and impedance liquid level sensing. FIG. 19 also depicts the encapsulant 735 that covers the driver 728 and connection between the liquid level sensing interface 1924 and the carrier 1922.

The driver 728 provides additional processing functionalities to the liquid level sensor 1900. For example, the driver 728 may be an application specific integrated circuit that allows for the determination as to whether the liquid in the liquid container is counterfeit. The driver 728 may also be used to drive the sensing components 1925, i.e., the heaters and sensors described above. In this example, the information collected from the number of sensing components 1925 is passed to this driver 728 and then onto the electrical contact pads 1936.

As described above, the liquid level sensing interface 1924 includes a number of liquid level sensing components 1925-1, 1925-2. For simplicity, in FIG. 19, a few liquid level sensing components 1925-1, 1925-2 are depicted, but the liquid level sensing components 1925 may extend along a length of the liquid level sensing interface 1924. Note that the liquid level sensing components 1925 as depicted in at least FIG. 19 are not to scale and are enlarged to show their presence on the liquid level sensing interface 1924. Different types of liquid level sensing components 1925 use different sensing methods to detect the level of liquid in the liquid container. For example, impedance liquid level sensing components 1925 detect the capacitance of a liquid with which the liquid level sensing component 1925 is covered. As liquid conducts electricity at a different rate then air, the conductivity between liquid level sensing components 1925 can be used to determine whether the conducting medium is air or liquid.

In one example, the liquid level sensing components 1925 are impedance sensing components that rely on the conductive distinctions between air and liquid to detect the level of the liquid in the chamber. In another example, the liquid level sensing components 1925 are thermal sensing components. Examples of thermal liquid level sensing components are the heaters and sensors described above. The liquid level sensing interface 1924 may be a high resolution liquid level sensing interface 1924 meaning it has a high density of liquid level sensing components 1925. For example, the liquid level sensing interface 1924 may include over 80 sensors per inch of length of the liquid level sensing interface 1924.

Figure 20:
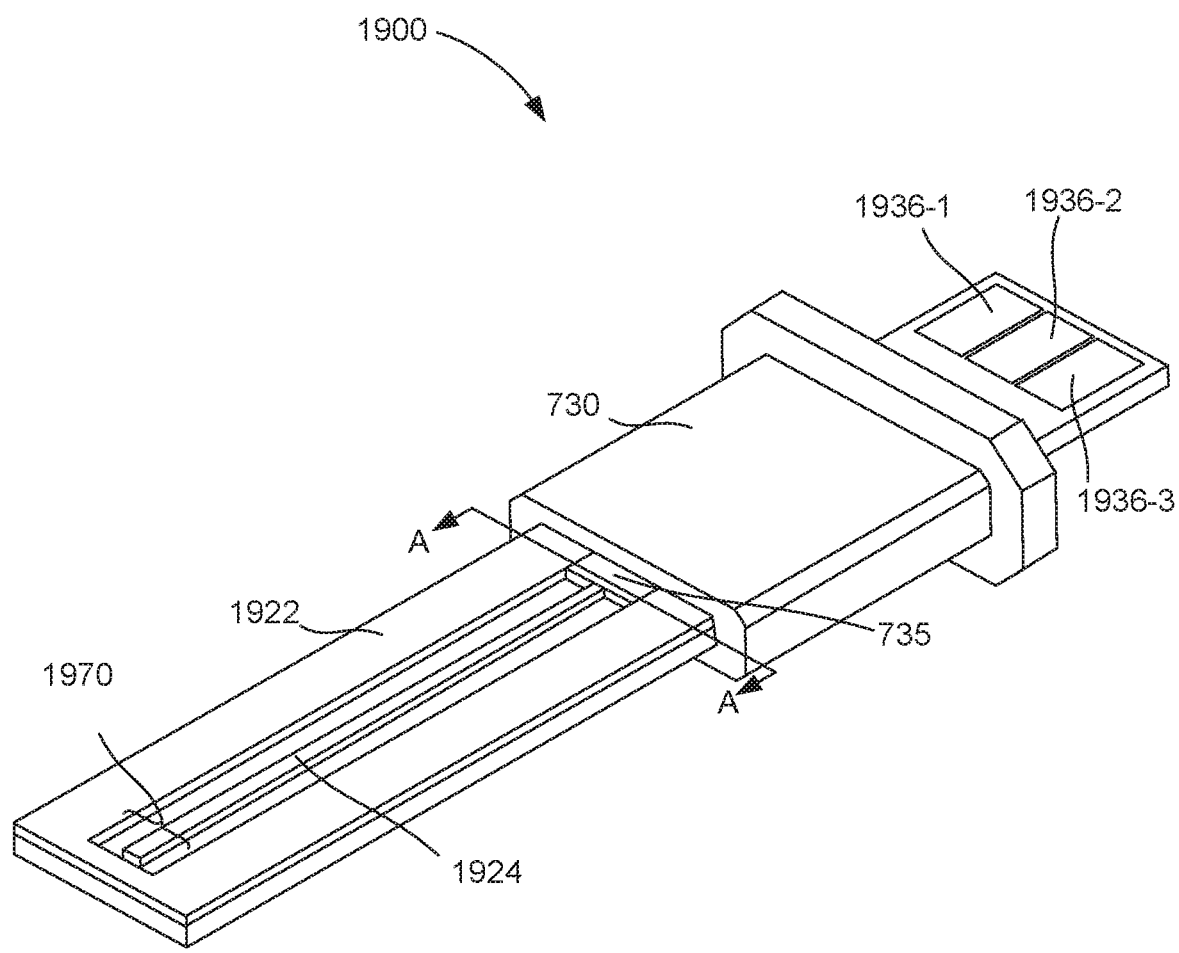
FIG. 20 is an isometric view of a liquid level sensor, according to one example of the principles described herein.

FIG. 20 is an isometric view of a liquid level sensor 1920, according to one example of the principles described herein. FIG. 20 depicts the electrical contact pads 1936, the carrier 1922, and the liquid level sensing interface 1924 described above. The liquid level sensor 1920 also includes a collar 730 similar to as described above to seal the liquid level sensor 1900 against a liquid container in which the liquid level sensor 1900 is inserted. In other words, the collar 730 serves as a supply integration interface between the carrier 1922 and the liquid container in which the liquid level sensor 1900 is used to detect level of liquid within a volume.

In some examples, as depicted in FIG. 20, the liquid level sensing interface 1924 is disposed within a recess 1970 of the carrier 1922. During manufacture, shipping, assembly, and use, the liquid level sensor 1900 may be subject to various external forces, which forces could damage the otherwise unprotected liquid level sensing interface 1924. Accordingly, the carrier 1922 may have a recess 1970 defined therein to contain and mechanically protect the liquid level sensing interface 1924.

A depth of the recess 1970 may be at least equal to the thickness of the liquid level sensing interface 1924. For example, the depth of the recess 1970 may be such that the liquid level sensing interface 1924 is recessed at least 200 micrometers below the surface of the carrier 1922. While specific reference is made of a particular distance that the liquid level sensing interface 1924 is recessed below the surface of the carrier 1922, the depth of the recess 1970 may be less. Depositing the liquid level sensing interface 1924 in a recess 1970 of the carrier reduces the likelihood of mechanical contact, and potential damage of the liquid level sensing interface 1924 and associated liquid level sensing components 1925.

FIG. 20 also depicts the encapsulant 735. In some examples, the encapsulant 735 is deposited just in a portion of the recess 1970, specifically that portion near the driver 728. In some examples, the driver 728, in addition to the liquid level sensing interface 1924, is disposed within the recess 1970 of the carrier 1920. Accordingly, the encapsulant 735 covers a portion of the liquid level sensing interface 1924, the driver 728, and any corresponding circuitry to connect these components.

Figure 21:
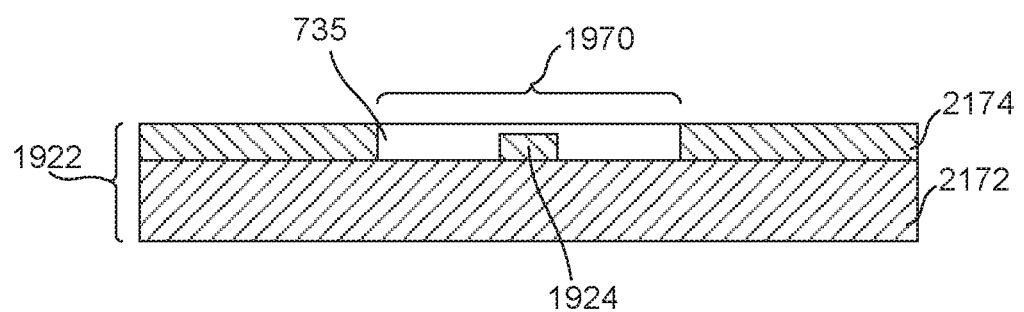
FIG. 21 is a cross-sectional view of the liquid level sensor of FIG. 20, according to one example of the principles described herein.

FIG. 21 is a cross-sectional view of the liquid level sensor 1900 of FIG. 20, according to one example of the principles described herein. Specifically, FIG. 21 is a cross-sectional view taken along the line A-A from FIG. 20. FIG. 21 depicts the liquid level sensing interface 1924 disposed within a recess 1970 of the carrier 1922. As can be seen in FIG. 21, the liquid level sensing interface 1924 is not raised above a top surface of the carrier 1922. So doing ensures that the liquid level sensing interface 1924 is protected from mechanical damage.

FIG. 21 also depicts the encapsulant 735 that is disposed over at least a portion of the liquid level sensing interface 1924. As depicted in FIG. 21, in some examples, the encapsulant 735 is deposited to be flush with a top surface of the carrier 1922. Having the encapsulant 735 be flush with the top surface of the carrier 1922, and not lower than or higher than, simplifies the integration of the collar 730.

The recess 1970 can be formed in any number of ways. For example, as depicted in FIG. 21, the carrier 1922 may include multiple layers, specifically a base layer 2172 and a coverlay 2174. The base layer 2172 may be formed to have a relatively flat surface and the coverlay 2174 may have a hole that defines the recess 1970. In this example, the coverlay 2174 is attached to the base layer, by adhesive 2172 for example. In this example, the liquid level sensing interface 1924 is disposed on the base layer 2172. The coverlay 2174 may be formed as a pre-punch laminate, for example of polyimide. In another example, the coverlay 2174 is a pre-preg layer. While FIG. 21 specifically depicts multiple layers being used to define the recess 1970, other methods may be used. For example, the recess 1970 may be defined via a molding process of a single layer. In yet another example, material may be removed from a single layer, for example, via routing, laser etching, or other material removal process, to form the recess 1970. While specific reference is made to particular modes of forming the recess 1970, any mode may be used to generate a recess 1970 that is at least as deep as the liquid level sensing interface 1924 is thick so as to mechanically protect the liquid level sensing interface 1924 from contact during manufacture, shipping, assembly, and use.

Figure 22:
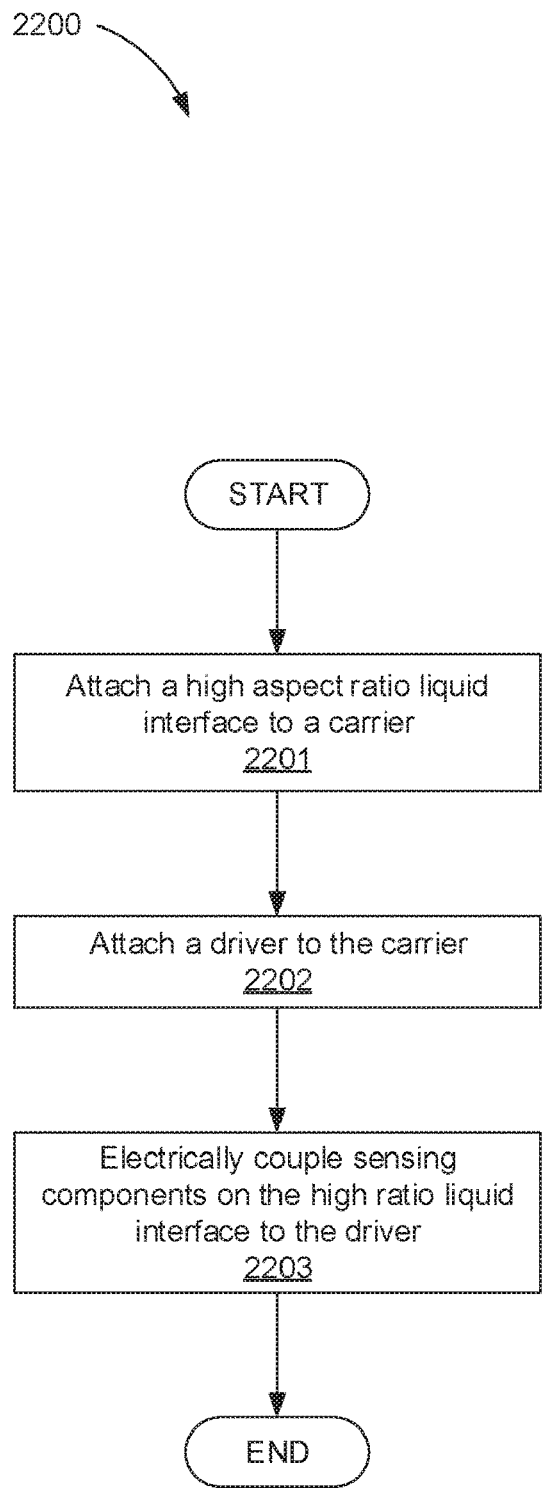
FIG. 22 is a flowchart of a method for forming a liquid level sensor, according to one example of the principles described herein.

FIG. 22 is a flowchart of a method 2200 for forming a liquid level sensor 1900, according to one example of the principles described herein. According to the method 2200, a high aspect ratio liquid level sensing interface 1924 having a number of liquid level sensing components 1925 disposed thereon is attached (block 2201) to a carrier 1922. Specifically, the carrier 1922 may have a recess 1970 defined therein. In one example, it is within this recess 1970 that the high aspect ratio liquid level sensing interface 1924 is disposed. Disposing the liquid level sensing interface 1924 into the recess 1970 affords protection against mechanical damage to the liquid level sensing interface 1924 and corresponding liquid level sensing components 1925. The liquid level sensing interface 1924 may be attached (block 2201) to the carrier 1922 in any number of fashions. For example, an adhesive may be stamped onto the carrier 1922 and the liquid level sensing interface 1924 can then be placed on the adhesive. When the adhesive cures, the liquid level sensing interface 1924 is affixed to the carrier 1922. While specific reference is made to a stamp adhesive, other methods may be used as well.

The driver 728 is also attached to the carrier 1922. As described above, the driver 728, like the liquid level sensing interface 1924 may be disposed within the recess 1970. As described above the carrier 1922 can control the operation of the liquid level sensing components 1925, and can also relay information from the liquid level sensing components 1925 to the electrical contact pads 1936. Similar to the liquid level sensing interface 1924, the driver 728 is attached (block 503) to the carrier 1922 in any number of fashions, including using an adhesive stamp. In these examples, after the components are attached, the adhesive is cured so as to permanently affix the liquid level sensing interface 1924 and the driver 728 to the carrier 1922.

According to the method 2200, the liquid level sensing components 1925 and electrical contact pads 1936 are coupled together via the liquid level sensing interface 1924 and the driver 728 such that signals can be interchanged between these components. For example, the liquid level sensing interface 1924 can be plasma and wire-bonded to the electrical interconnects 1936.

Figure 23:
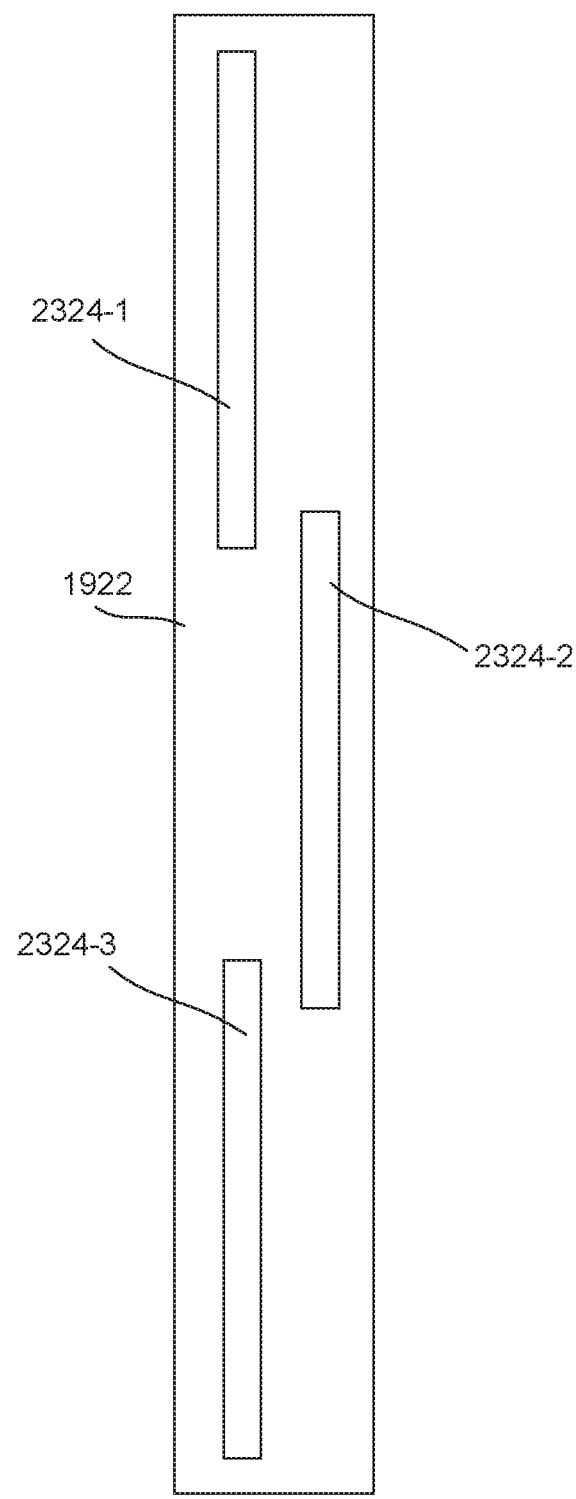
FIG. 23 is a top view of a liquid level sensor, according to one example of the principles described herein.

FIG. 23 is a top view of a portion of a liquid level sensor, according to one example of the principles described herein. Specifically, FIG. 23 depicts a portion of the liquid level sensor that includes a carrier 1922. As described above, the carrier 1922 provides mechanical support and electrical connectivity for liquid level sensing interfaces 2324. In some examples, the carrier supports multiple liquid level sensing interfaces 2324-1, 2324-2, 2324-3. The different liquid level sensing interfaces 2324-1, 2324-2, 2324-3 may have different characteristics. For example, the different liquid level sensing interfaces 2324 may have different types of sensing components as well as different densities of sensing components. For example in addition to including liquid level sensing components 1925, the liquid level sensing interfaces 2324 may include sensing components that measure other properties of the liquid and/or liquid container.

As described above, each liquid level sensing interface 2324 may have a different density of sensing components. For example, as the level of a liquid in a liquid container drops, greater resolution liquid level measurements may be desired. Accordingly, a liquid level sensing interface 2324-1 closer to the bottom of the liquid container may include a greater number of sensing components 1925 per inch so as to provide increased resolution. Accordingly, a middle liquid level sensing interface 2324-2 may have a lower resolution liquid level detection, i.e., fewer sensing components 1925 per inch. Still further, a top liquid level sensing interface 2324-1 may have even lower resolution.

Any of the liquid level sensing interfaces 2324 may have other sensing components disposed thereon. For example, prior to use, but after manufacture and shipping, it may be desirable to verify certain characteristics of the liquid container to ensure proper function. For example, a strain gauge, pressure measurement device, liquid property sensing device, or a temperature sensor may be included to ensure that the liquid container is able to properly supply liquid to the system. Accordingly, these components may be included on any one of the liquid level sensing interface 2324, for example, a top liquid level sensing interface 2324-1

In one example, using such a device for sensing a liquid level 1) provides a low cost, high volume, and simple manufacturing process; 2) protects the small elongated strip; 3) provides a high resolution and high performance liquid level sensing platform; 4) supports multiple processes for detecting liquid levels; and 5) results in increased customer satisfaction due to the increased performance. However, it is contemplated that the devices disclosed herein may address other matters and deficiencies in a number of technical areas.

The preceding description has been presented to illustrate and describe examples of the principles described. This description is not intended to be exhaustive or to limit these principles to any precise form disclosed. Many modifications and variations are possible in light of the above teaching.

Further features of this disclosure can be defined by the following clauses.

Clause 1: A liquid level sensor comprising:
a carrier;
a liquid level sensing interface disposed on the carrier, the liquid level sensing interface having an aspect ratio of at least 1:50;
a number of liquid level sensing components disposed on the liquid level sensing interface, the number of liquid level sensing components to detect a liquid level in a liquid container; and
an electrical interconnect to output data collected from the number of liquid level sensing components.

Clause 2: The sensor of clause 1, wherein the fluid is ink.

Clause 3: The sensor of clause 1, wherein the liquid level sensor is disposed in a liquid container.

Clause 4: The sensor of clause 1, wherein the number of liquid level sensing components are thermal liquid level sensing components.

Clause 5: The sensor of clause 1, wherein the number of liquid level sensing components are impedance liquid level sensing components.

Clause 6: The sensor of clause 1, wherein the sensor is disposed in a recess of the carrier.

Clause 7: The sensor of clause 1, wherein more than 80 liquid level sensing components are disposed per inch of liquid level sensing interface.

Clause 8: A method for forming a liquid level sensor, comprising:
attaching a high aspect ratio liquid level sensing interface, having a number of liquid level sensing components disposed thereon, to a carrier, wherein the high aspect ratio liquid level sensing interface is disposed in a recess of the carrier;
attaching a driver to the carrier, the driver to output data collected from the number of liquid level sensing components; and
electrically coupling the number of liquid level sensing components to the driver via the high aspect ratio liquid level sensing interface.

Clause 9: The method of clause 8, wherein the recess is at least as deep as the thickness of the high aspect ratio liquid level sensing interface.

Clause 10: A liquid level sensor comprising:
a carrier to:
provide electrical connectivity between a liquid level sensing interface and an electrical interconnect; and
provide mechanical protection of the liquid level sensing interface;
a liquid level sensing interface disposed in a recess of the carrier, the liquid level sensing interface having an aspect ratio of at least 1:50;
a number of liquid level sensing components disposed on the liquid level sensing interface, the number of liquid level sensing components to detect a liquid level in a liquid container;
a driver to output data collected form the number of liquid level sensing components to the electrical interconnect;
an encapsulant disposed over a connection between the liquid level sensing interface and the driver;
the electrical interconnect to output data collected from the driver; and
a collar to seal the liquid level sensor against a liquid container in which the liquid level sensor is inserted.

Clause 11: The sensor of clause 10, wherein the liquid level sensing interface is less than 220 micrometers wide.

Clause 12: The sensor of clause 10, wherein the driver is to verify authenticity of the liquid container in which the liquid level sensor is inserted.

Clause 13: The sensor of clause 10, wherein the liquid level sensing interface supports various types of sensing components.

Clause 14: The sensor of clause 10, further comprising multiple liquid level sensing interfaces, each liquid level sensing interface having different characteristics.

Clause 15: The sensor of clause 14, wherein the multiple liquid level sensing interfaces have different densities of liquid level sensing components.

What is claimed is:
1. A liquid level sensor comprising:
a carrier;
a liquid level sensing interface disposed on the carrier, the liquid level sensing interface having an aspect ratio of at least 1:50;
a number of liquid level sensing components disposed on the liquid level sensing interface, the number of liquid level sensing components to detect a liquid level in a liquid container; and
an electrical interconnect to output data collected from the number of liquid level sensing components.

2. The liquid level sensor of claim 1, wherein the liquid level sensing interface extends along a length of the carrier.

3. The liquid level sensor of claim 1, wherein the number of liquid level sensing components are thermal liquid level sensing components.

4. The liquid level sensor of claim 1, wherein the liquid level sensing interface comprises a strip, a series of heaters and a series of sensors.

5. The liquid level sensor of claim 4, wherein each of the heaters is sufficiently close to a sensor such that the heat emitted by the individual heater may be sensed by the associated sensor.

6. The liquid level sensor of claim 4, wherein each heater is independently actuatable to emit heat independent of other heaters.

7. The liquid level sensor of claim 4, wherein each heater is an electrical resistor.

8. The liquid level sensor of claim 4, wherein heaters and sensors are arranged in pairs.

9. The liquid level sensor of claim 8, wherein the electrical interconnect is an interface by which signals from the sensors of the liquid level sensing interface are transmitted to a separate controller, the controller to determine a level of liquid within the sensed volume by individually pulsing the heater of the pair and comparing the magnitude of the temperature, as sensed from the sensor of the same pair, relative to heater pulsing parameters to determine whether liquid or air is adjacent to the individual heater/sensor pair.

10. The liquid level sensor of claim 4, wherein the heaters and sensors are arranged in an array of stacks vertically spaced along the length of the strip.

11. The liquid level sensor of claim 4, wherein each sensor is spaced no greater than 20 μm from an individual heater.

12. The liquid level sensor of claim 4, comprising a driver to output data collected from the number of liquid level sensing components, the number of liquid level sensing components electrically coupled to the driver via the liquid level sensing interface, wherein the electrical interconnect is electrically connected to the driver as well as the heaters and sensors of the liquid level sensing interface.

13. The liquid level sensor of claim 12 wherein the driver as well as the electrical connections between the driver, the liquid level sensing interface and the electrical interconnect are covered by an encapsulant.

14. The liquid level sensor of claim 1, wherein the electrical interconnect has electrical contact pads.

15. The liquid level sensor of claim 1, wherein the fluid is ink.

16. The liquid level sensor of claim 1, wherein more than 80 liquid level sensing components are disposed per inch of liquid level sensing interface.

17. A liquid container with disposed therein the sensor of claim 1.

18. The liquid container of claim 17, wherein the liquid level sensing interface includes an elongated strip, a series of heaters and a series of sensors, wherein the elongated strip is to be extended into a volume of the container that contains the liquid.

19. The liquid container of claim 18, wherein the strip is supported along a side of the volume such that a face of the strip adjacent the side of the volume is not opposed by the liquid.

20. A liquid level sensor comprising:
   a printed circuit board carrier;
   a silicon liquid level sensing interface disposed on the carrier, the liquid level sensing interface having an aspect ratio of at least 1:50;
   a number of liquid level sensing components disposed on the liquid level sensing interface, the number of liquid level sensing components comprising separate heaters and sensors interdigitated along the liquid level sensing interface to detect a liquid level in a liquid container, wherein a density of sensors varies along a length of the liquid level sensing interface with a greater density of sensors at a lower portion as compared to a density of sensors at an upper portion; and
   an electrical interconnect to output data collected from the number of liquid level sensing components.

* * * * *